(12) United States Patent
Hecht

(10) Patent No.: US 7,887,265 B2
(45) Date of Patent: Feb. 15, 2011

(54) CUTTING TOOL AND SYSTEM FOR ATTACHING A CUTTING MEMBER TO A CUTTER

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 531 days.

(21) Appl. No.: 12/042,940

(22) Filed: Mar. 5, 2008

(65) Prior Publication Data

US 2008/0232910 A1    Sep. 25, 2008

(30) Foreign Application Priority Data

Mar. 20, 2007   (IL)   ..................... 182078

(51) Int. Cl.
*B23C 5/24* (2006.01)
*B23C 5/00* (2006.01)
(52) U.S. Cl. .......................... 407/37; 407/38
(58) Field of Classification Search ............... 407/37, 407/36, 38, 44, 45, 46, 77, 79, 87, 88
See application file for complete search history.

(56) References Cited

U.S. PATENT DOCUMENTS

| | | | |
|---|---|---|---|
| 4,547,100 A | 10/1985 | Naccarato et al. | |
| 4,592,680 A | 6/1986 | Lindsay | |
| 5,160,228 A | 11/1992 | Arai et al. | |
| 5,271,442 A * | 12/1993 | Carpenter et al. | ........... 144/220 |
| 5,567,092 A * | 10/1996 | Post | ............. 407/38 |
| 6,004,080 A * | 12/1999 | Qvarth et al. | ............. 407/36 |
| 6,254,319 B1 | 7/2001 | Maier et al. | |
| 7,311,477 B2 * | 12/2007 | Hecht et al. | ............. 407/37 |

FOREIGN PATENT DOCUMENTS

| | | |
|---|---|---|
| DE | 3042050 | 7/1982 |
| EP | 0449253 | 10/1991 |
| EP | 0624415 | 2/1994 |
| FR | 2851738 | 9/2004 |
| JP | 1996039325 | 2/1996 |
| WO | WO02062513 | 8/2002 |
| WO | WO2004020133 | 3/2004 |

OTHER PUBLICATIONS

International Search Report mailed Jul. 3, 2008 in PCT/IL2008/000322.
Chinese Office Action in application No. 200880008978.5, dated Oct. 13, 2010.

* cited by examiner

*Primary Examiner*—Will Fridie, Jr.
(74) *Attorney, Agent, or Firm*—Womble Carlyle

(57) ABSTRACT

A system for attaching a cutting member to a cutter body includes a pin, a clamping bolt and an adjustment bolt. The pin has a longitudinal axis and at least a first attachment bore and a second attachment bore. The clamping bolt has a clamping section which is formed to releasably secure the cutting member to the cutter body and has a first attachment section which is formed to be releasably secured in the first attachment bore of the pin. The system may have an adjustment bolt that has an adjustment section which is formed to adjust the position of the cutting member relative to the cutter body and has a second attachment section which is formed to be releasably secured in the second attachment bore of the pin.

35 Claims, 17 Drawing Sheets

CUTTING TOOL AND SYSTEM FOR ATTACHING A CUTTING MEMBER TO A CUTTER

FIELD OF THE INVENTION

The present invention is directed to a system for a cutting tool to attach a cutting member, such as a cutting insert or cartridge, to a cutter body and a pin. The invention is also directed to a correspondingly adapted cutting insert, cartridge and cutter as well as to a method for forming the same. The invention is particularly directed to such elements for milling a workpiece.

BACKGROUND OF THE INVENTION

Cutters that utilize insert carrying cartridges or cassettes are known. A few examples of patents relating to such cutters are U.S. Pat. No. 5,567,092, EP0624415, U.S. Pat. Nos. 6,254,319, 4,547,100.

U.S. Pat. No. 4,592,680 is directed to a rotary cutter for holding replaceable cutting inserts. The cutter includes a cylindrical bore having a generally radially disposed axis which makes an acute angle with the insert cutting face, thus forming a wedge-shaped portion in the holder between the insert-supporting face and the axis of the bore. A cylindrical locking member is received in the bore. Threads of an insert-retaining locking screw engage the locking member. The wedge-shaped portion of the holder causes increased tension in the locking screw during rotation of the cutter at high rotational speeds due to centrifugal forces applied on the cutting insert and on the cylindrical locking member.

EP 0 449 253 corresponding to U.S. Pat. No. 5,160,228 relates to a cutting tool including a tool body having a plurality of mounting recesses formed on an end thereof. Each of the mounting recesses has a mounting face respectively formed at the bottom thereof. The mounting face has a first threaded hole formed therein. A plurality of inserts are each respectively disposed on the mounting face and secured under pressure onto the mounting face by means of a clamping screw screwed into the first threaded hole. The cutting tool is characterized in having a plurality of reduced hardness regions respectively formed under the mounting face inside the tool body, each of the reduced hardness regions having the first threaded hole formed therein and a hardness lower than the hardness of the tool body. In one embodiment, the reduced hardness regions are formed by embedding a right cylindrical column into a straight hole of round cross section formed under each mounting face of the tool body.

SUMMARY OF THE INVENTION

It is the object of the present invention to provide an attachment system for a cutting tool comprising, a cutting member, a pin, a cutter body and method of forming those elements.

The present invention is particularly directed to a system for attaching a cutting member to a cutter body, optionally a rotating cutter body or, alternatively, a non-rotating cutter body. A pin is provided preferably having a longitudinal axis, the pin comprising at least a first attachment bore and a second attachment bore. Typically both bores extend in a generally radial manner and are at least roughly parallel to one another. Furthermore, a clamping bolt is provided which has a clamping section which is particularly formed to releasably secure the cutting member to the cutter body. The clamping bolt has a first attachment section which is formed to be releasably secured in the first attachment bore of the pin. An adjustment bolt is provided which has an adjustment section which is formed to adjust the position of the cutting member relative to the cutter body. The adjustment bolt has a second attachment section which is formed to be releasably secured in the second attachment bore of the pin.

The invention is also alternatively or additionally directed to a system for attaching a member made of a first material of a first hardness to a body made of a second material of a hardness less than the first hardness. The system comprises a pin having a longitudinal axis, the pin comprising at least a first attachment bore and being made of a third material of a hardness greater than the hardness of the second material of the body. A clamping bolt has a clamping section which is formed to firmly attach the member to the body and has a first attachment section which is formed to be firmly attached in the first attachment bore of the pin. Preferably, the member is a cutting member and the body is a cutter body which may be either a rotating cutting body or, alternatively, a non-rotating cutting body.

The attachment bores in the pin may be threaded bores and the attachment sections of the clamping bolt and the adjustment bolt may be threaded sections. In another embodiment, the clamping bolt and the adjustment bolt may be releasably secured via a bayonet connection or, in yet another embodiment, via a hooked connection.

The pin optionally has a generally cylindrical outer shape. However, also an oval, polygonal or any other suitable shape can be provided.

The pin is preferably divided into at least two segments which are either firmly or releasably, optionally elastically joined to each other or optionally separated from each other. In one embodiment in which the pin segments are separated it is optional to provide an engagement means for rotational engagement of the two segments. This engagement means can be releasable in an axial direction, such as a claw coupling. A key and groove engagement is also possible. This would allow a rotational engagement in case the outer segment is rotated, then, the inner segment could also be rotated so as to align the bores provided in both segments.

The pin may have at least a recess or at least one groove between the attachment bores. The pin may alternatively have a connecting element between the two segments made of another material which is more elastic than the material from which the pin is made. Such an elastic intermediate element could be any suitable plastics or rubber material which can be adhered between the two segments.

The pin optionally has further at least one torque transmitter provided at an end face for turning the pin and aligning the attachment bores with the cutter body. Optionally the end face may further comprise an indicator that indicates the direction of the clamping bore and the adjustment bore of the pin.

The clamping section of the clamping bolt, being optionally a clamping screw, may be a slanted head engaging a correspondingly shaped clamping hole in the cutting member for clamping the cutting member to the cutter body.

Further optionally, the adjustment section of the adjustment bolt, optionally being an adjustment screw, may be a slanted head engaging a correspondingly shaped slanted portion of an adjustment section of the cutting member for adjusting the cutting member in a defined position with respect to the cutter body.

If desired, the system may further comprise a friction bolt that may be a friction screw and the pin further comprises a third or friction bore. Typically the third bore is at least roughly parallel to the second attachment bore.

The invention is also directed to a cutting member for a system, particularly as described above. The cutting member comprises a clamping hole for allowing a clamping bolt to extend through the cutting member and for allowing an engagement of a head of the clamping bolt. The cutting member has further at least one slanted portion for allowing an engagement of an adjustment bolt to properly adjust the cutting member with respect to the cutter body.

Moreover, the slanted portion described before is preferably provided in a concave recess portion which is located at the opposite end to a cutting section of the cutting member.

Further preferably, the cutting member is a cutting insert, a cutting plate or a cartridge for a cutting insert or a cutting plate.

Preferably the cartridge has a cartridge pocket for a cutting insert or a cutting plate.

Further preferably, the invention is directed to a cutting tool, and particularly for a system and/or a cutting member as described before. The cutter body may be made of a light alloy, such as an aluminum alloy, further preferably a high strength aluminum alloy. In the cutter body there is provided at least one pin bore at a front face of the cutter body for allowing the pin described above to be introduced into the pin bore from the front face. Each of the at least one pin bore is associated with a cutter pocket, for allowing the cutting member to be attached to the cutter body. Moreover, each pocket is provided with a pocket clamping opening from the pocket to the pin bore.

Typically the cutter body is further provided with a pocket adjustment bore provided from the pocket to the pin bore.

If desired the pocket clamping opening is a clamping bore.

Optionally the cutter body is further provided with a friction bore provided from a generally cylindrically-shaped cutter peripheral surface to the pin bore.

The invention is also directed to a method of forming an attachment system, a cutting member and/or a cutter body according to any of the above described embodiments. The invention also embraces the use of an attachment system, a cutting member and/or a cutter body according to any of the above portions of the description for high speed milling.

The present invention is particularly advantageous for very high speed milling operations which are preferably performed as finishing steps on top surfaces of aluminum engine blocks and bottom surfaces of aluminum cylinder heads, as a substitute to precision grinding operations, to obtain very high surface quality finish and perfect match between the cylinder heads and the engine block.

The cutting tool preferably comprises a generally cylindrical cutter body preferably made from aluminum, and a plurality of axially adjustable cutting members, optionally cartridges, each located in a corresponding pocket formed in the cutter body and opening out axially forwardly to a cutter face and radially outwardly to a tool peripheral surface. In an axial section taken perpendicularly through the cartridge and the pocket, the cartridge and the pocket preferably have corresponding trapezoidal cross-sections tapering outwardly while extending axially generally parallel to the longitudinal axis of rotation of the cutting tool and forming a dovetail shape.

Each cartridge is optionally made of steel, and further preferably comprises a forward cutting portion and a cartridge body extending rearwardly therefrom and formed integrally therewith.

The cartridge has a clamping bore extending therethrough, in which a clamping bolt extends to be threadingly engaged in a threaded clamping bore formed in the pin.

The invention has the preferred advantages of providing an aluminum tool body in which steel cartridges are releasably secured, without using attaching fasteners that engage the aluminum body in any direct way. Rather than being threaded into soft aluminum material, the cartridge is secured by a bolt threaded into the steel pin. The pin spreads the load exerted by the bolt over a much larger area than that obtainable by bolt threads, and therefore reduced local clamping stresses to a level which the aluminum body can withstand.

The pin has an additional most preferred function in that it can rotate around a longitudinal pin axis parallel to a longitudinal tool axis, so that the clamping bolt securing it to the tool body will self-align with the direction of the forces acting thereupon, thereby assuring that the clamping bolt will carry mostly (and preferably, only) tension loads rather than tension, shear and bending loads that would have occurred if such a rotation (or alignment) motion would have been prevented. Since the tool is used in very high rotational speeds, minimizing loads on the clamping bolts contributes greatly to the robustness, accuracy and safety of the cutting tool, and to increased allowable rotation speed, thereby increasing productivity and finished products quality.

The cutting portion of the cartridge may have a cutting plate brazed thereto, or a cutting insert removably secured therein. The cutting portion can be a brazed plate or a replaceable insert, and the plate or insert may be made from any appropriate material. The plate or insert can also be attached or secured to the cartridge in various known methods. The cutting edges of the insert or plate may be formed, shaped or function in any conventional manner.

The body of the cutter is preferably made of a light alloy or aluminum and is more preferably meant for very high rotational speeds which may be as high as 50,000-60,000 rpm. The invention preferably allows for a firm attachment of a cartridge with an insert or the insert itself to the cutter body withstanding the large centrifugal forces applied thereto during operation of the cutting tool.

The invention has the preferred advantage that there are no threaded surfaces in the cutter body which would limit the lifetime of the cutting tool, particularly in case the cutter body is made of a light alloy.

There is a surface to surface contact between the pin and the pin bore and between the cartridge and the pocket. All of the threaded surfaces are on the bolts and the pin which preferably result in a more simple arrangement with a considerable longer service life of the cutting tool.

The pin and the cartridge exert compressive force on the cutter body while the bolts bear the combined stresses. This design allows for the cutter body to be made of a light alloy. This design further allows for the cutter pockets to be closer to each other thus closer packed around the perimeter of the cutter body, allowing the cutting tool to have a closer pitch for a given diameter.

BRIEF DESCRIPTION OF THE FIGURES

For a better understanding the invention will now be described, by way of example only, with reference to the accompanying drawings in which.

DETAILED DESCRIPTION OF THE INVENTION

Figure 1:
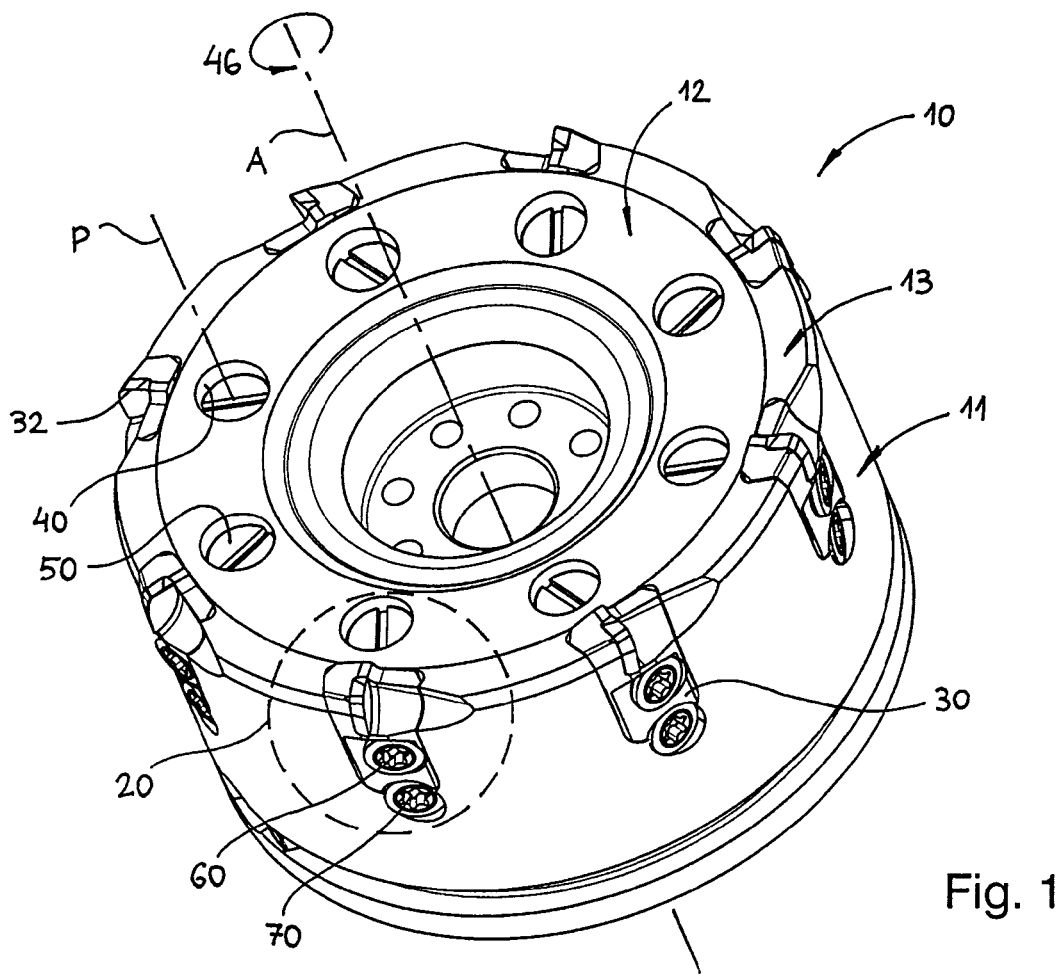
FIG. 1 shows a perspective view of a cutting tool in accordance with a preferred embodiment of the invention.
Figure 2:
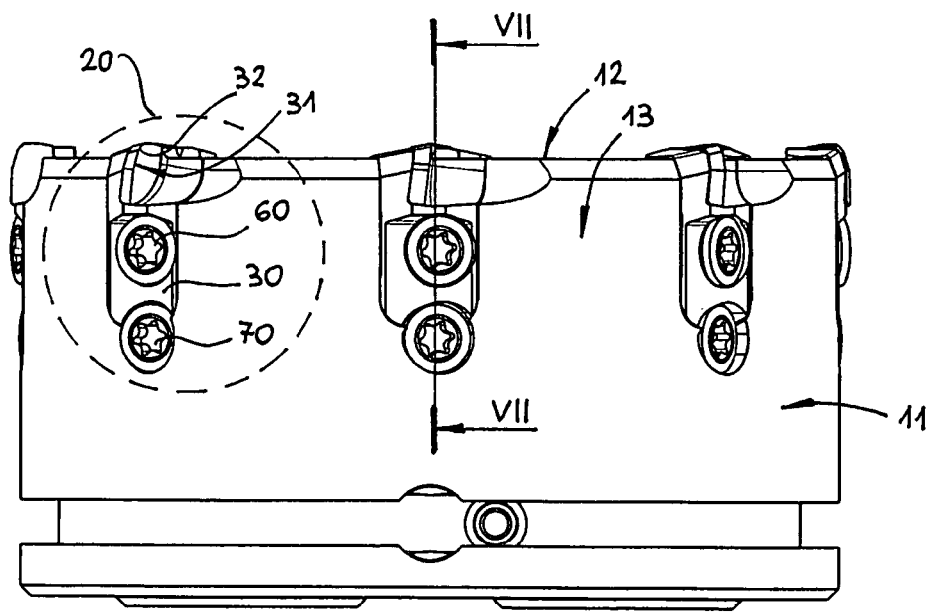
FIG. 2 shows a side view of the cutting tool shown in FIG. 1.
Figure 3:
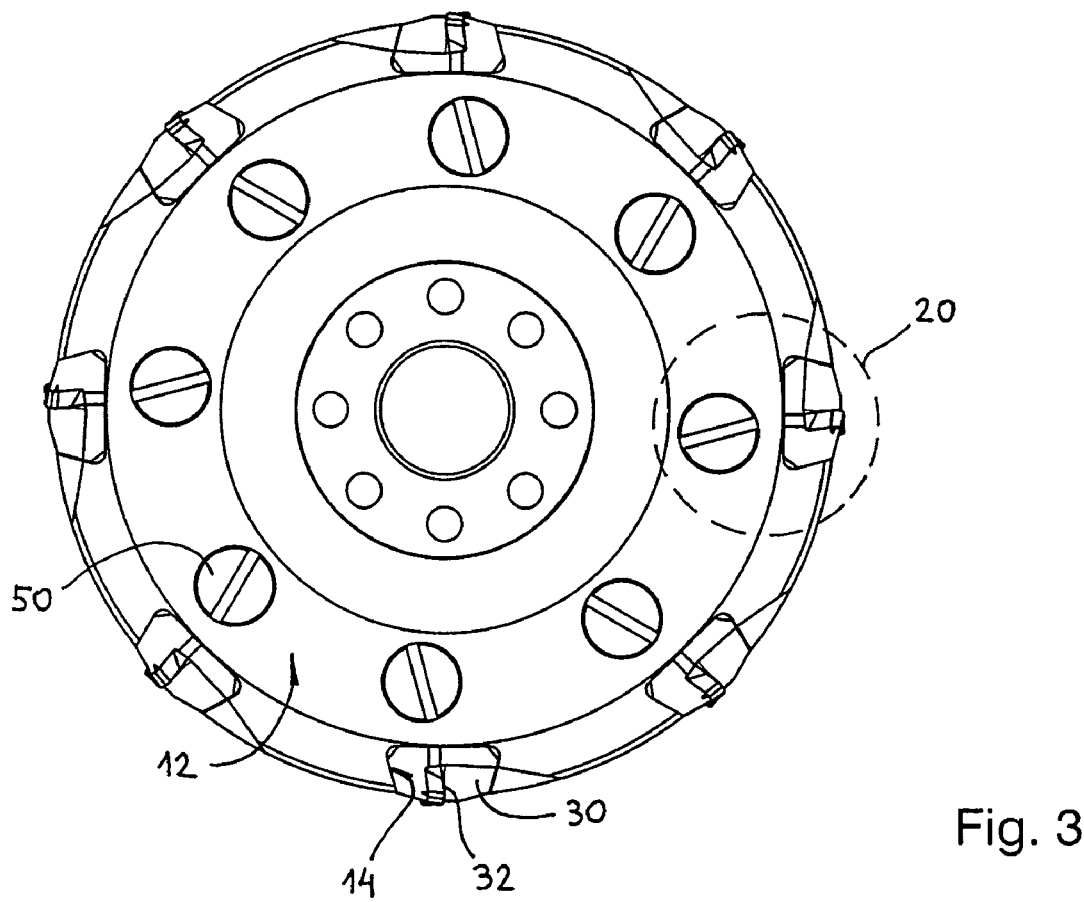
FIG. 3 shows a face view of the cutting tool shown in FIG. 1.
Figure 4:
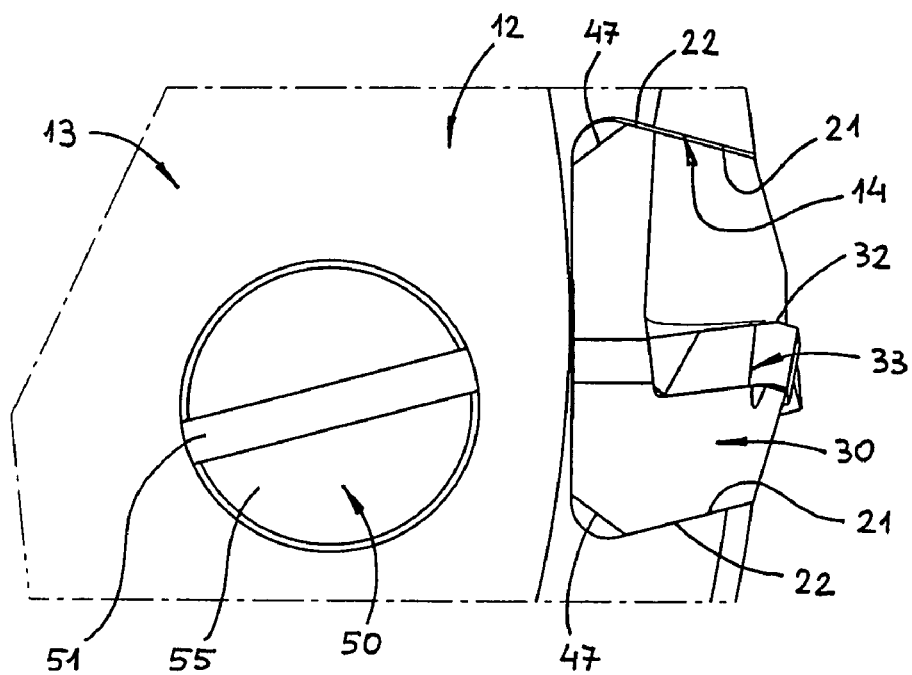
FIG. 4 shows a face view of a pocket of the cutting tool shown in FIG. 3.

FIGS. 1, 2 and 3 show the structure of a cutting tool 10 for high speed milling or more preferably for very high speed milling operations in accordance with a preferred embodiment of the invention. More particularly, the cutting tool 10 has a cutter body 13 formed from a material having a third hardness. Typically, when used for very high speed milling, the cutter body 13 may be made from aluminum. The cutter body 13 has a generally cylindrically-shaped cutter peripheral surface 11 extending rearwardly from a cutter front face 12 coaxially with a longitudinal axis of rotation A. Preferably, a plurality of cutter pockets 14 are provided in the outer periphery of the cutter front face 12, the cutter pockets 14 optionally opening radially outwardly and axially forwardly. Each cutter pocket preferably accommodates a cutting member 30 that is formed from a material having a first hardness. The cutting member 30 may be made of steel. The cutting member 30 has a cutting portion 31 with at least one cutting edge 32 formed therein. The cutter pocket 14 is provided with a pair of axially extending and radially outwardly converging pocket tangential abutment surfaces 21. The cutting member 30 is provided with a pair of axially extending and radially outwardly converging member tangential abutment surfaces 22 that mate in size and shape with the pocket tangential abutment surfaces 21. Thus, the cutter pockets 14 and each respective cutting member 30 are preferably correspondingly dovetailed, or wedge shaped, as is best shown in FIGS. 4 and 8 so that they may be in positive engagement in the radial outward direction of the cutter body 13. This arrangement may provide support to the cutting member 30 against radially outwardly directed centrifugal forces acting thereon during very high speed milling operations. Thus, the cutting member 30 is further supported in the radial direction by the cutter body 13 thereby reducing stresses in a clamping bolt 60 due to centrifugal forces acting on the cutting member 30. This provides a more stable machining operation, a more reliable cutting tool 10, and enables using the cutting tool 10 safely at very high machining speeds. In some embodiments, the member tangential abutment surfaces 22 may be interrupted by a member relief surface 23 (see FIG. 15). The particular shape, form and arrangement of the cutting portion 31, and whether it is integrally formed with the cutting member 30 or detachably secured thereto, may be the subject of different embodiments. The cutting member 30 may also be a cutting insert or a cartridge with a brazed or otherwise attached cutting plate or with a replaceable cutting insert. In which case, the cartridge comprises a cartridge pocket 27 for retaining a cutting insert or a cutting plate 28. The attachment system for attaching such cutting member 30 to the milling cutter body 13 bears the reference number 20 in FIGS. 1-3 and is shown in further detail in FIGS. 4-9 while the particular members of such attachment system are shown in FIGS. 10-16.

Each cutter pocket 14 is associated with a pin bore 40 extending from the cutter front face 12, the pin bore 40 having a pin bore axis P that extends optionally generally parallel to the longitudinal axis of rotation A. However, the pin bore axis P may also be inclined to the longitudinal axis of rotation A. Each pin bore 40 accommodates a pin 50, having a pin axis N and a generally cylindrical outer shape (see FIG. 10), conforming in shape and dimensions to the pin bore 40. The pin 50 is formed from a material having a second hardness. Typically, the pin 50 is made of steel. It is clear that the pin 50 is preferably smaller than the pin bore 40 in order to facilitate insertion of the pin 50 into the pin bore 40.

In FIGS. 1 and 2 there are also apparent a clamping bolt 60 for clamping the cutting member 30 to the cutter body 13 and an adjustment bolt 70 for adjusting the cutting member 30 with respect to the cutter body 13.

Figure 5:
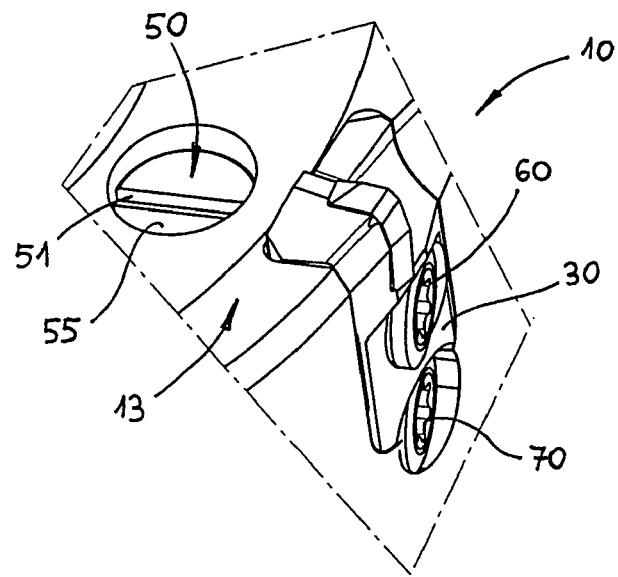
FIG. 5 shows a perspective view of a pocket of the cutting tool shown in FIG. 1 together with a removably secured pin, cutting member, clamping bolt and adjustment bolt.

FIGS. 4-7 show the attachment system 20. In FIG. 4 a face view of the attachment system 20 is shown including an end face 55 of the pin 50 and an optionally provided screw drive or torque transmitter 51 in its end face 55. The torque transmitter 51 is optionally a slot or in other embodiments it may have other known configurations such as cross-point, star-shape, hexagonal, or square. FIG. 4 also shows in better detail the cutter pocket 14 provided in the cutter body 13 as well as the cutting member 30 with a cutting plate or cutting insert 33 and the respective cutting edge 32. FIG. 5 shows these elements in a perspective view. The advantage of a cutting tool 10 according to the present invention is that any threads in the cutter body 13 are avoided since it is made from aluminum which is relatively a soft metal and more susceptible to bending and wear. Therefore, the cutting tool 10 withstands higher loads at higher machining speeds without suffering negative effects. The first hardness of the cutting member 30 and the second hardness of the pin 50 are both greater than the third hardness of the cutter body 13.

Figure 6:
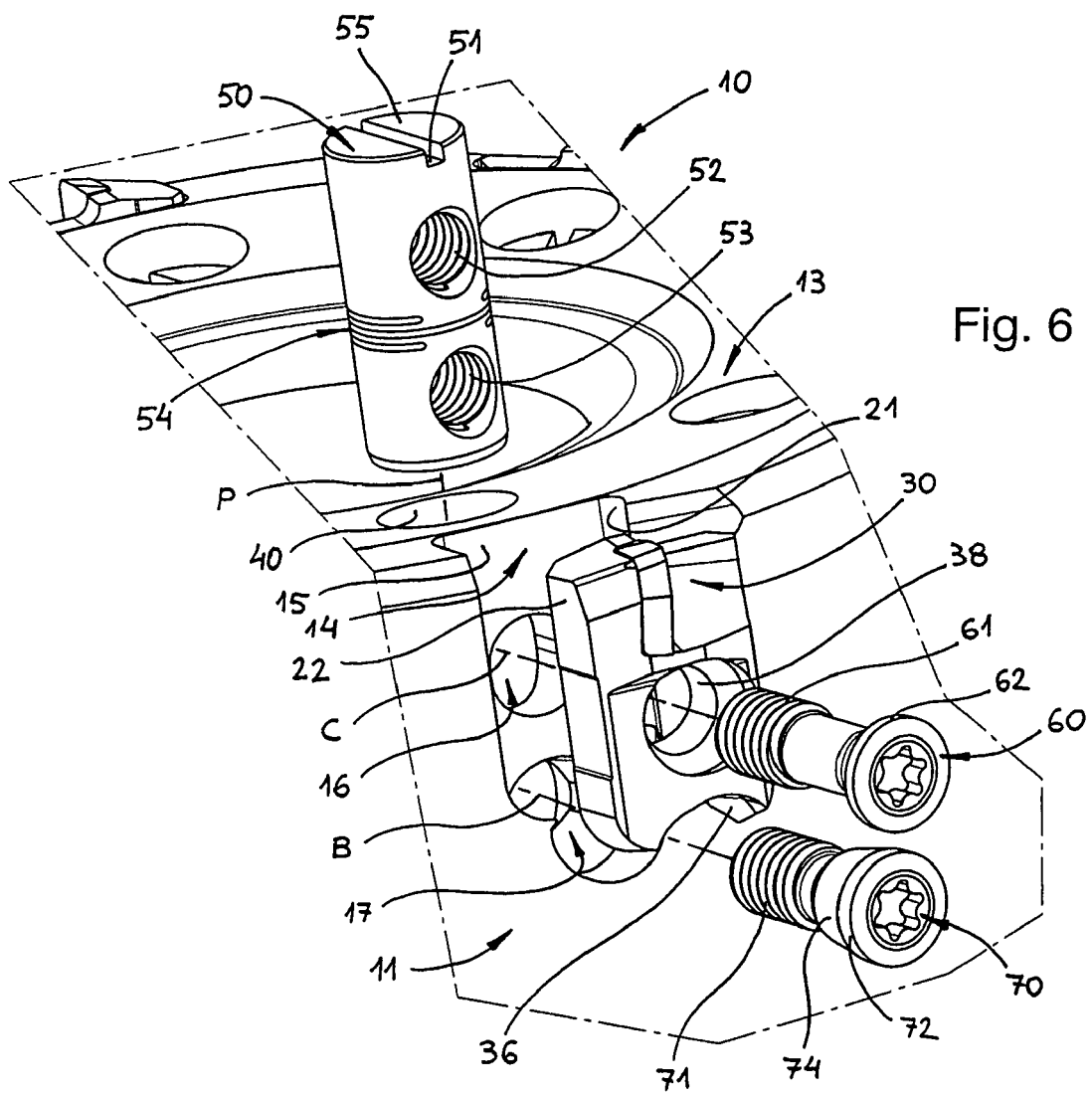
FIG. 6 shows an exploded perspective view of the pocket shown in FIG. 5.

FIG. 6 shows an exploded perspective view of the cutter pocket 14, pin 50, pin bore 40 and cutting member 30 of the milling cutter together with the clamping bolt 60 and the adjustment bolt 70. The cutter pocket 14 comprises a pocket base 15, and a pocket clamping opening formed as a pocket clamping bore 16 which communicates with the pin bore 40. The pocket clamping bore 16 has a pocket clamping bore axis C that extends generally radially outwardly from the pin bore axis P. The cutter pocket 14 also comprises a pocket adjustment bore 17 which communicates with the pin bore 40. The pocket adjustment bore 17 has a pocket adjustment bore axis B that extends generally radially outwardly from the pin bore axis P. Thus, both the pocket clamping bore 16 and the pocket adjustment bore 17 extend from the pocket base 15 to an opening in the pin bore 40. They are oriented so that when the pin 50 is located within the pin bore 40 the pocket clamping bore 16 is aligned with a first attachment bore in the pin 50 hereinafter called a pin clamping bore 52 and the pocket adjustment bore 17 is aligned with a second attachment bore hereinafter called a pin adjustment bore 53 in the pin 50. The torque transmitter 51 may also serve as an indicator that indicates the direction of the pin clamping bore 52 and the pin adjustment bore 53 relative to the pin bore 40. Alternatively, a separate indicator (not shown) such as an indentation may be provided on the end face 55 of the pin 50.

The clamping bolt 60 has a first attachment section 61 being typically a threaded portion, a head 62, and an intermediate portion 63 therebetween. The head 62 of the clamping bolt 60 has a slanted conical head portion 64 (see FIG. 7) constituting a clamping section that tapers toward the intermediate portion 63. According to alternative embodiments, the slanted conical head portion 64 of the clamping bolt 60 does not have to be conical and it may be slanted in a different manner. Similarly, the adjustment bolt 70 has a second attachment section 71 being typically a threaded portion, a head 72, and an intermediate portion 73 therebetween. The head 72 of the adjustment bolt 70 has a slanted conical head portion 74 constituting an adjustment section that tapers toward the intermediate portion 73. According to alternative embodiments, the slanted conical head portion 74 of the adjustment bolt 70 does not have to be conical and it may be slanted in a different manner.

Figure 7:
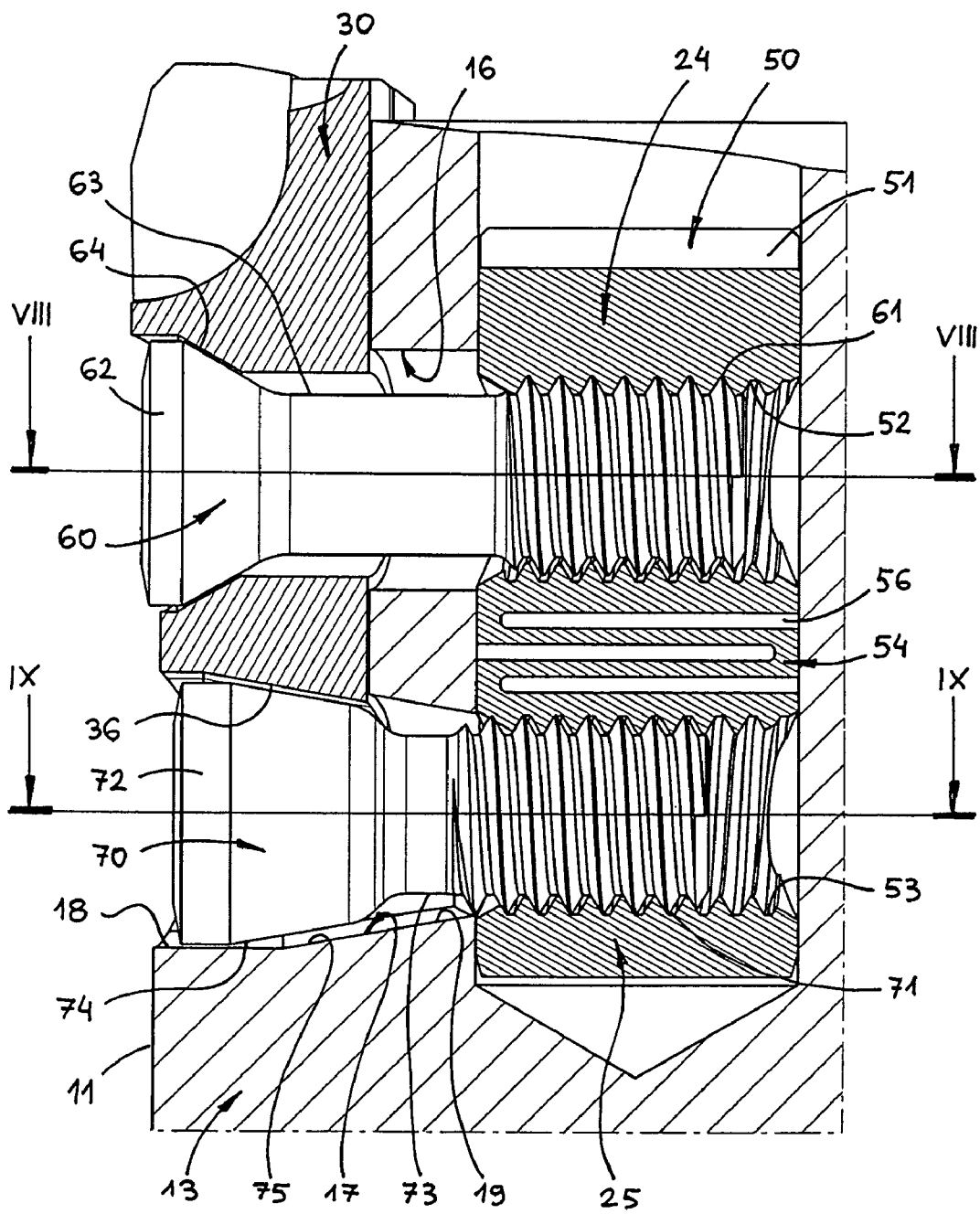
FIG. 7 shows a section side view of the pocket taken along line VII-VII in FIG. 2.
Figure 8:
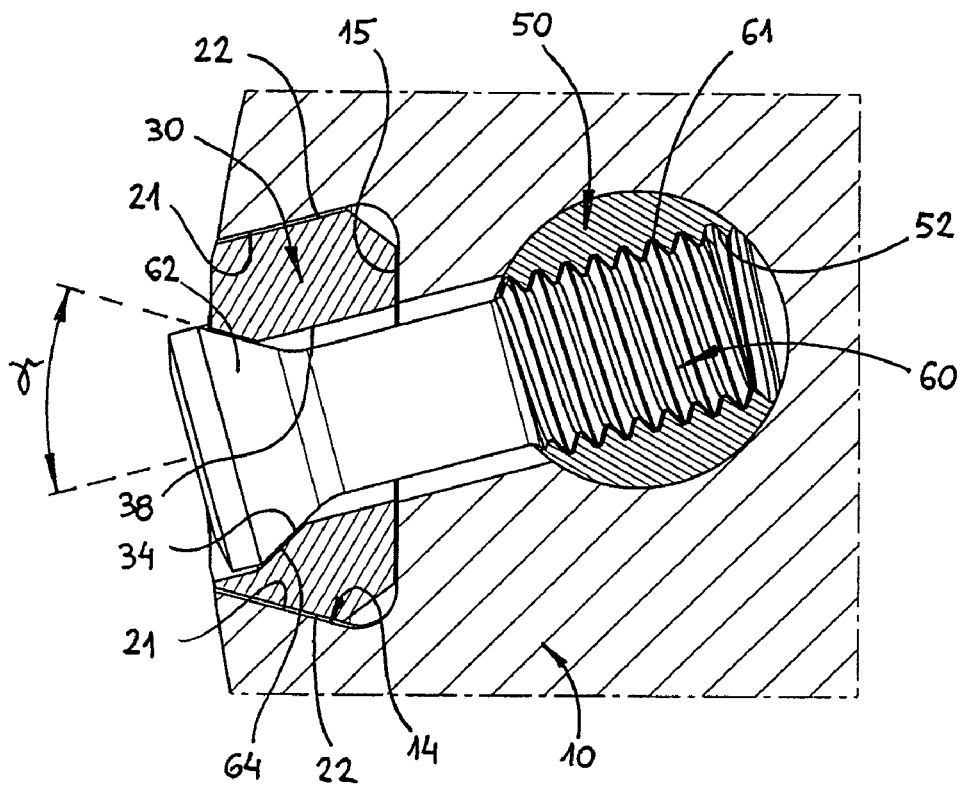
FIG. 8 shows a section view taken along line VIII-VIII in FIG. 7.

FIG. 7 shows a section side view to a portion of the milling cutter body 13, the cutting member 30, the pin 50, the clamping bolt 60 and the adjustment bolt 70. The clamping bolt 60 and the adjustment bolt 70 are preferably threaded and are shown in engagement with the respective pin clamping bore 52 and adjustment bore 53 provided in the pin 50. Further preferably, the pin 50 is provided with an elastic portion 54 for allowing a slight axial movement along the pin bore 40 of the pin clamping bore 52 with respect to the pin adjustment bore 53. The elastic portion 54, which may be in the form of grooves or recesses, shown generally as 56, is preferably provided in order to weaken the cross section between the pin clamping bore 52, found in a clamping segment 24 of the pin 50, and the pin adjustment bore 53 found in an adjustment segment 25 of the pin 50, and to increase axial resilience therebetween. The elastic portion 54 does not have to be necessarily provided with grooves 56. Alternatively, the connection between the two segments of the pin 50 may be implemented by other appropriate means that may be formed integrally with the pin 50 or separated therefrom.

Figure 9:
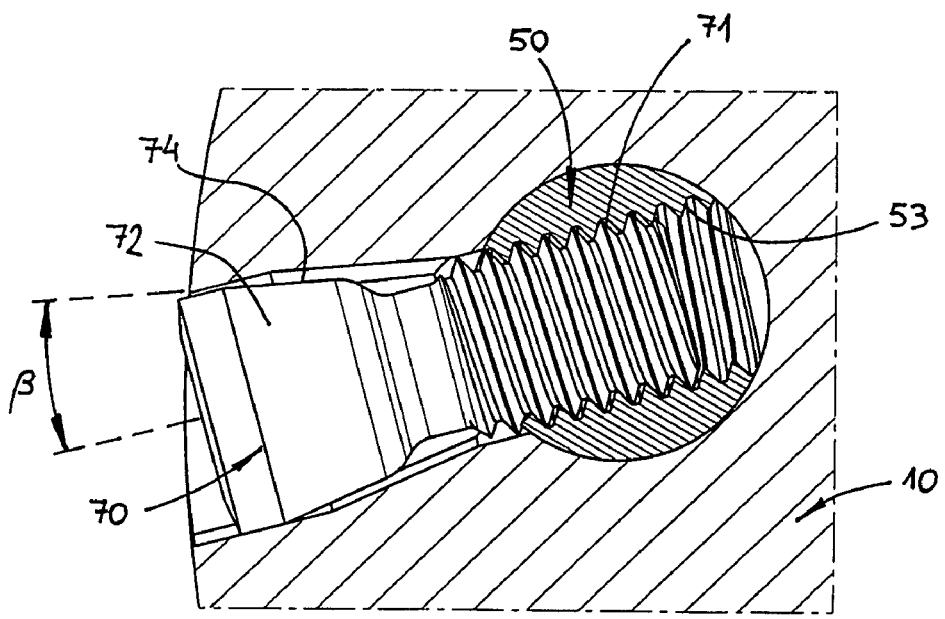
FIG. 9 shows a section view taken along line IX-IX in FIG. 7.

FIG. 8 shows the engagement of the clamping bolt 60 with the pin clamping bore 52. As shown, the clamping bolt 60 passes through a cutting member clamping hole 38 thus holding the cutting member 30 within the cutter pocket 14. FIG. 9 shows the engagement of the adjustment bolt 70 with the pin adjustment bore 53. Particularly, the engagement of the clamping bolt's head 62 and the adjustment bolt's head 72 with their particularly shaped slanted portions can be seen in these figures. The tapering angle β of the slanted conical head portion 74 of the head 72 of the adjustment bolt 70 may be smaller than the tapering angle γ of the slanted conical head portion 64 of the head 62 of the clamping bolt 60. While the end of the head 72 of the adjustment bolt 70 abuts a rear wall 75 of the pocket adjustment bore 17 of the cutter body 13 there is preferably a gap between the head 72 of the adjustment bolt 70 and the cutter body 13 away from the end of the head 72 of the adjustment bolt 70 towards the intermediate portion 73 of the adjustment bolt 70. This allows the adjustment bolt 70 to be screwed into the pin 50 for adjusting the cutting member 30. That is, the inward movement of the adjustment bolt 70 allows fine axial adjustment of the position of the cutting member 30 with respect to the cutter body 13 when the head 72 of the adjustment bolt 70 presses against a concave slanted portion 36 of the cutting member 30.

Figure 10:
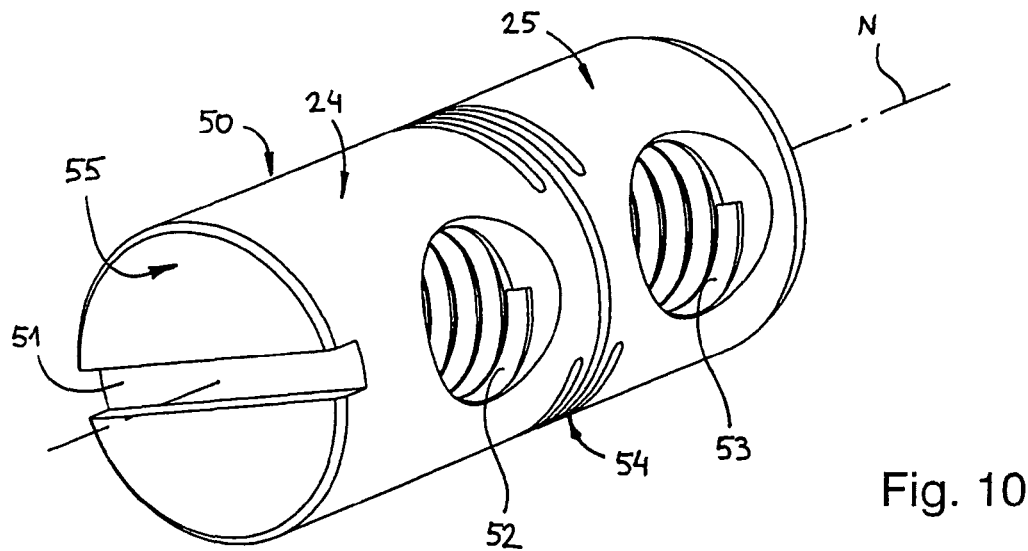
FIG. 10 shows a perspective view of the pin shown in FIG. 6.
Figure 11:
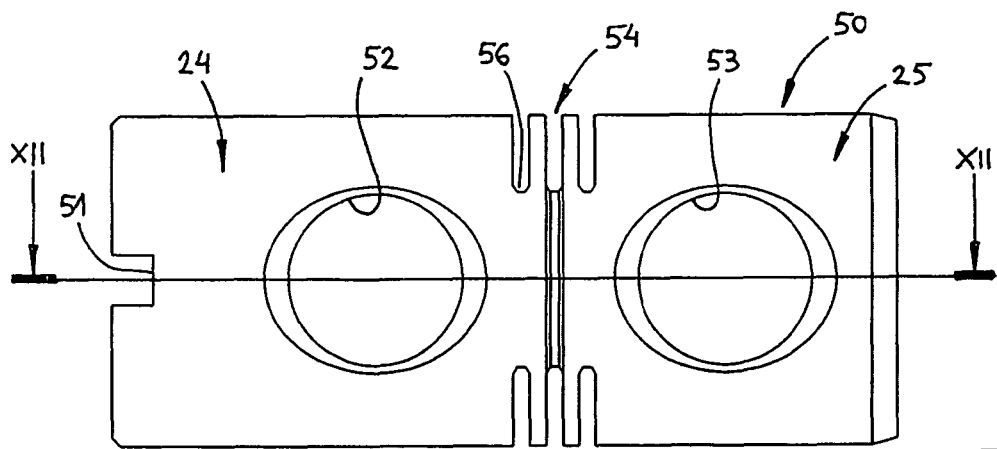
FIG. 11 shows a side view of the pin shown in FIG. 10.
Figure 12:
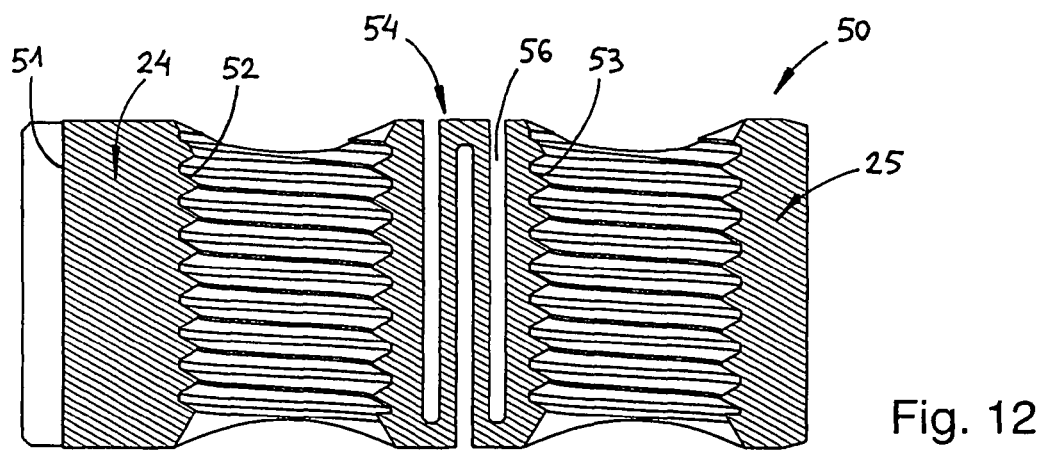
FIG. 12 shows a section view of the pin shown in FIG. 10 taken along line XII-XII in FIG. 11.
Figure 13:
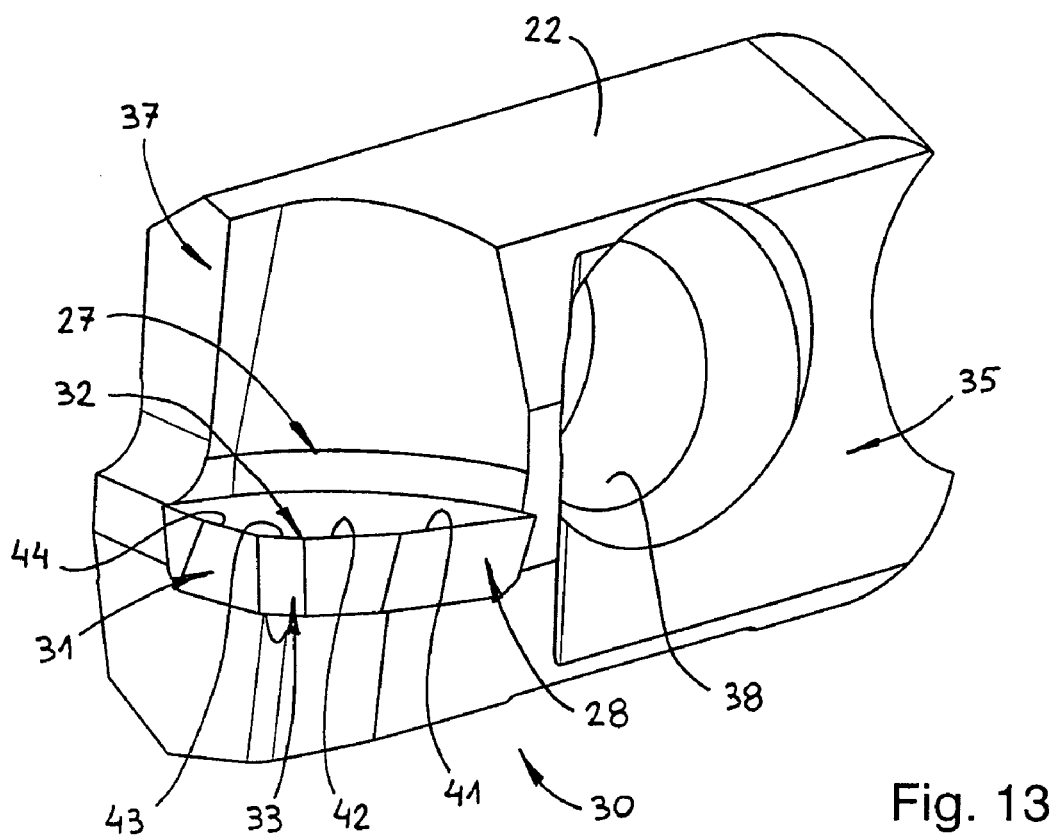
FIG. 13 shows a perspective view of the cutting member and insert shown in FIG. 6.

FIGS. 10-12 show the structure of the pin 50 of the preferred embodiment in further detail. The already aforementioned elements, namely, the slot 51, the pin clamping bore 52 and the pin adjustment bore 53 as well as the elastic portion 54 depicted as recesses and/or grooves 56 are shown in further detail in these Figures. A plurality of single grooves are provided which are alternatingly arranged. Each single groove 56 preferably extends over 80-98% of the diameter of the pin 50. Further preferably, each single groove 56 extends over 90-95% of the diameter of the pin 50. Typically, there are provided between two to five grooves 56. Further typically, there are provided three grooves 56.

FIGS. 13-16 show one embodiment of the cutting member 30 in the form of a cartridge. As seen in FIGS. 13 to 16, the cutting member 30 has two opposite ends. Proximate a first end is a cutting portion 31, which may be formed either as a cutting plate or a cutting insert 33. In case of a cutting plate, the plate is preferably brazed onto the cartridge. In case of a cutting insert, it is preferably indexable and secured to the cartridge in a releasable manner.

Cutting portion 31 has at least one cutting edge 32. According to a specific arrangement of the cutting edge 32, it is provided with four cutting edge portions. A first cutting edge portion 41 functions as a peripheral cutting edge and it extends generally parallel to the longitudinal axis of rotation A when the cutting member 30 is mounted in a cutter pocket 14 in the cutter body 13. A second cutting edge portion 42 extends inwardly from the first cutting edge portion 41 and obliquely with respect thereto. A third cutting edge portion 43 extends inwardly from the second cutting edge portion 42 and obliquely with respect thereto and with respect to the longitudinal axis of rotation A. A fourth cutting edge portion 44 extends inwardly from the third cutting edge portion 43 and is generally perpendicular to the longitudinal axis of rotation A.

A cutting section 37 is at or around the cutting portion 31 of the cutting member 30. At the second end of the cutting member 30, opposite the cutting section 37, the cutting member 30 is provided with an adjustment section 35 which is best seen in FIG. 15. The adjustment section 35 has a concave slanted portion 36, for allowing the adjustment bolt 70 (not shown in FIGS. 13-16) to engage the concave slanted portion 36 in a predefined manner and for allowing the adjustment of the position of the cutting member 30 upon the further entry of the adjustment bolt 70 into the pin 50. The dovetail shape between the member tangential abutment surfaces 22 of the cutting member 30 may extend between the cutting section 37 of the cutting member 30 and the concave adjustment section 35 thereof.

Preferably, the concave slanted portion 36 is formed from a plurality of slanted segments 45. The arrangement of the slanted segments 45 enables to define the contact region between the adjustment bolt 70 and the concave slanted portion 36. Thus, the contact region is defined in a manner that the slanted conical head portion 74 of the adjustment bolt 70 applies a pressing force W against the concave slanted portion 36 of the adjustment section 35, in a general direction shown by the arrow 26 in FIG. 15, to move the cutting member 30 in an axial direction with respect to the cutter body 13. At the same time, the pressing direction guarantees that the spaced apart member tangential abutment surfaces 22 of the cutting member 30, that are spaced by the member relief surface 23, remain in firm contact with the corresponding pocket tangential abutment surface 21 that tangentially support the cutting member 30 against tangentially directed cutting forces applied thereon during machining. Therefore, it is advantageous that the force W applied by the slanted conical head portion 74 of the adjustment bolt 70 on the concave slanted portion 36 should not be parallel to the member tangential abutment surfaces 22 on both sides of the cutting member 30, but, be transversely directed thereto as shown by the arrow 26.

Figure 15:
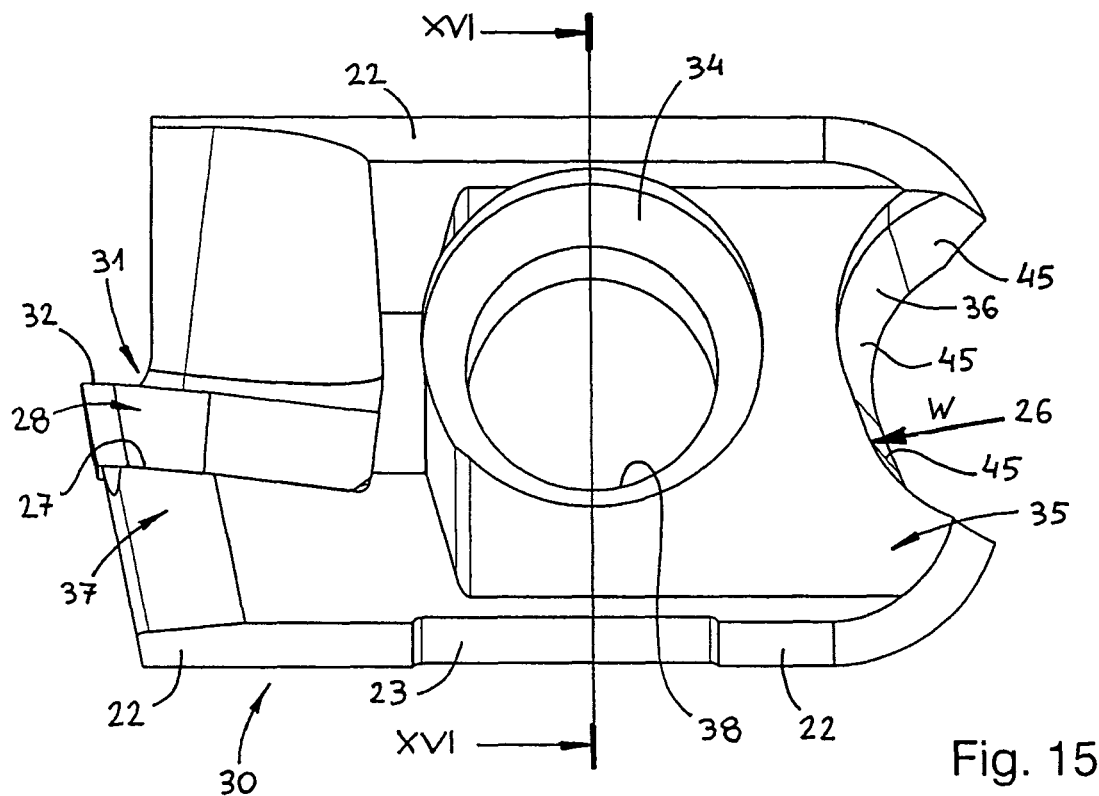
FIG. 15 shows a side view of the cutting member and insert shown in FIG. 13.
Figure 16:
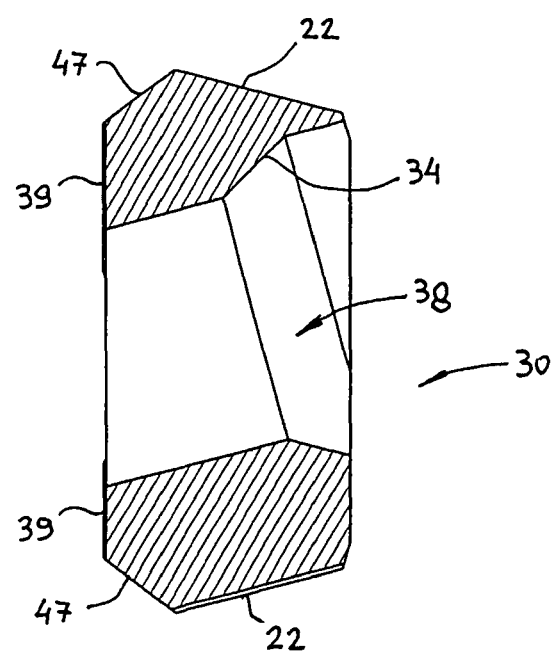
FIG. 16 shows a section view of the cutting member shown in FIG. 13 taken along line XVI-XVI in FIG. 15.
Figure 17:
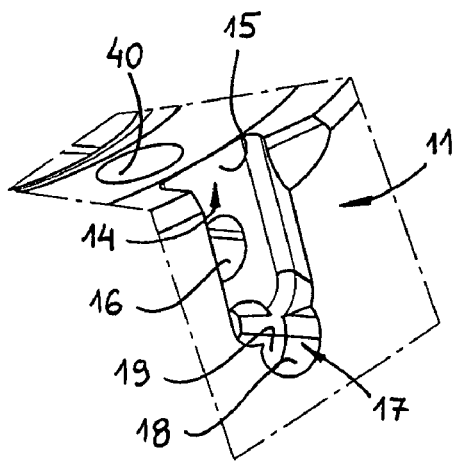
FIG. 17 shows a perspective view of the pocket shown in FIG. 6.
Figure 18:
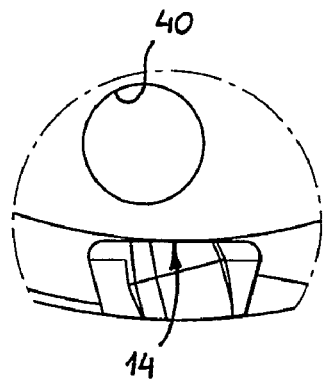
FIG. 18 shows a face view of the pocket shown in FIG. 17.

As seen in FIG. 15, the concave slanted portion 36 is spaced apart from the cutting member clamping hole 38, which is provided with its own slanted surface 34. In FIGS. 15 and 16, the slanted surface 34 of a cutting member clamping hole 38 is shown for engaging the respective head 62 of the clamping bolt 60 (not shown in FIGS. 15 and 16). In FIG. 16 radial abutment surfaces 39 on a base of the cutting member 30 are further shown. When the cutting member 30 is mounted in the cutter pocket 14 of the cutter body 13, the radial abutment surfaces 39 of the cutting member 30 abut the pocket base 15 of the cutter pocket 14.

Figure 14:
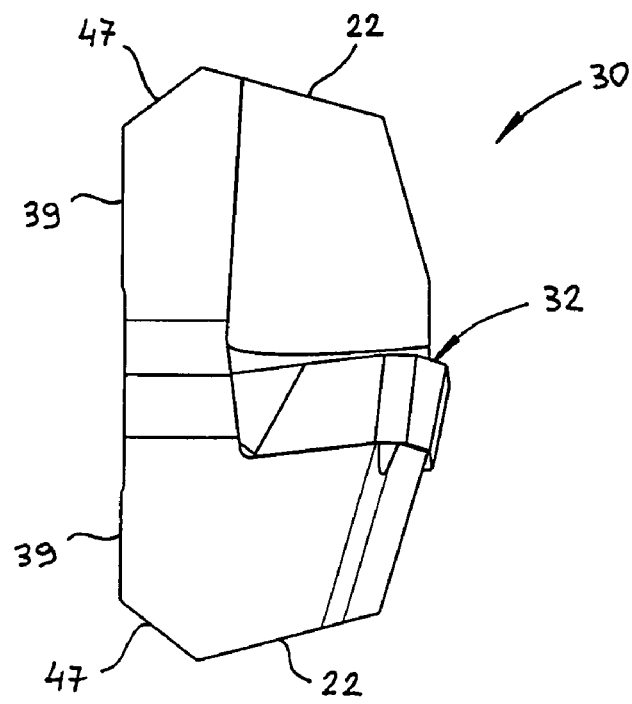
FIG. 14 shows a face view of the cutting member and insert shown in FIG. 13.

As shown in FIGS. 4, 14 and 16, the cutting member 30 is optionally provided with two chamfered surfaces 47 that extend between the member tangential abutment surfaces 22 and the radial abutment surfaces 39 of the cutting member 30. The chamfered surfaces 47 provide adequate clearance to the cutting member 30 when it is seated within the cutter pocket 14 in the cutter body 13.

The cutting member 30 is preferably removably secured in the cutter pocket 14 of the cutter body 13 by the clamping bolt 60 that passes through the cutting member clamping hole 38, through the pocket clamping bore 16 and is screwed into the pin clamping bore 52. The adjustment bolt 70 passes through the pocket adjustment bore 17 and is screwed into the pin adjustment bore 53. The head 72 of the adjustment bolt 70 abuts the concave slanted portion 36 of the cutting member 30.

Figure 19:
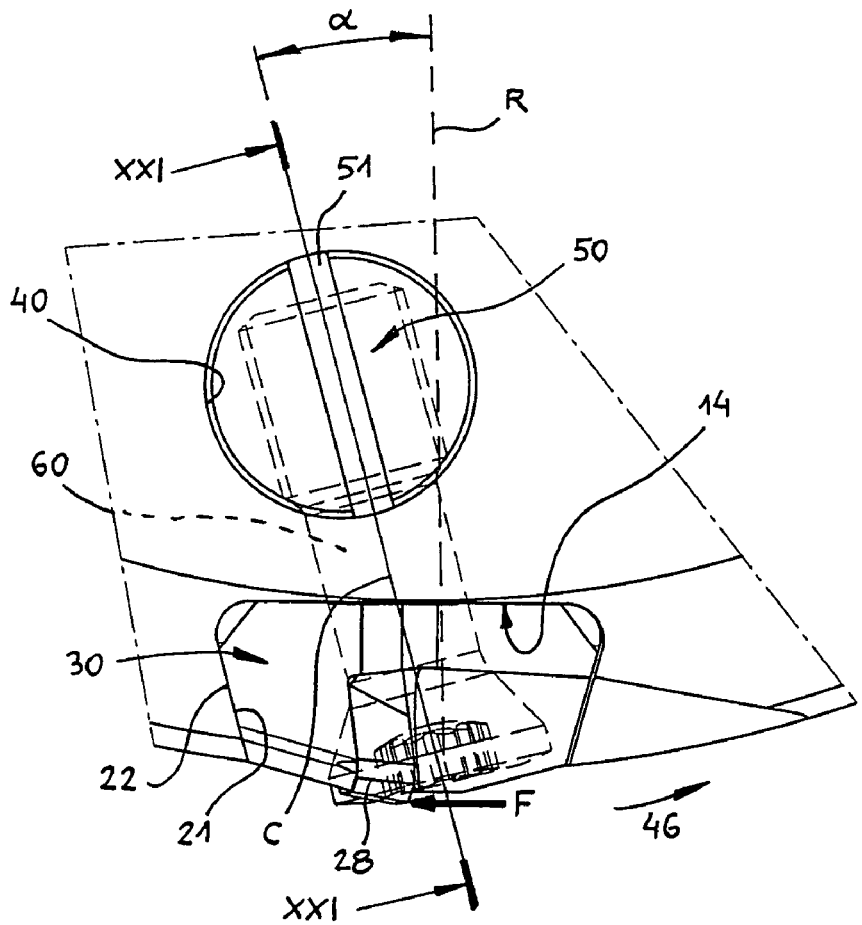
FIG. 19 shows a face view of the pocket shown in FIG. 18 together with the hidden clamp bolt.
Figure 20:
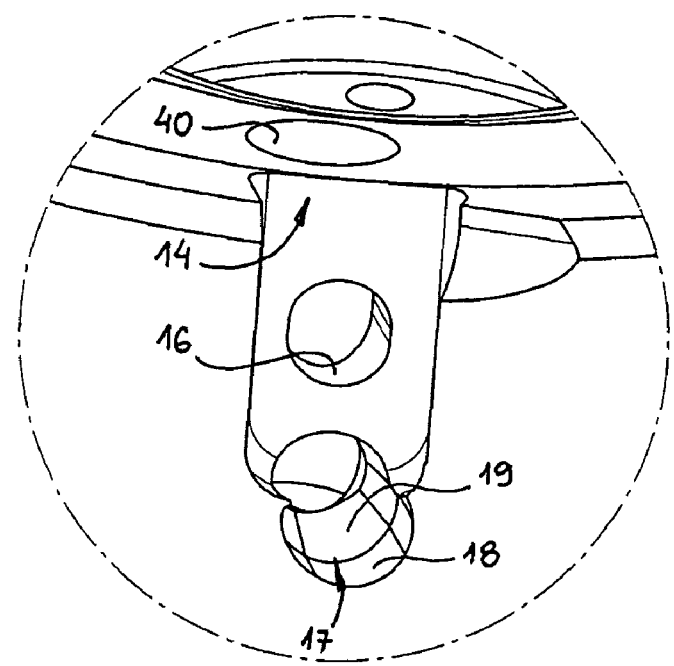
FIG. 20 shows a side view of the pocket shown in 17.
Figure 21:
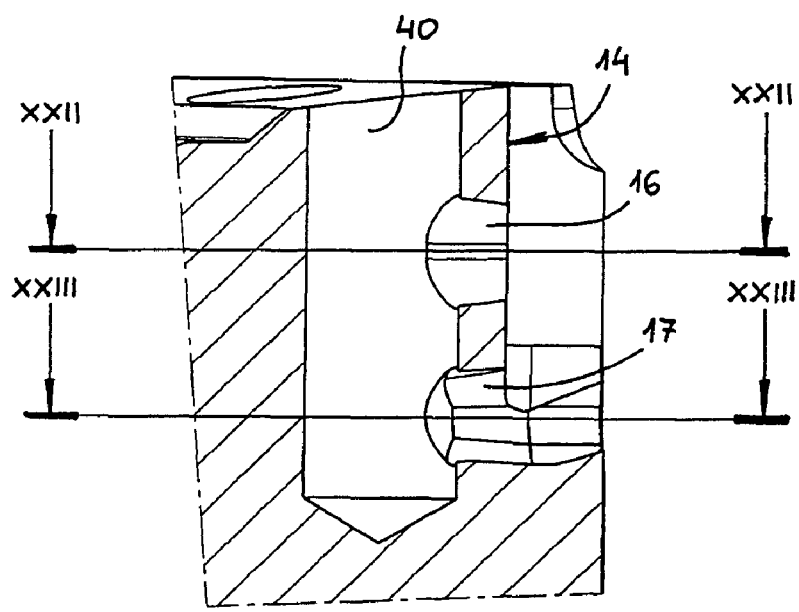
FIG. 21 shows a radial section view of the pocket show in FIG. 17 taken along line XXI-XXI in FIG. 19.
Figure 22:
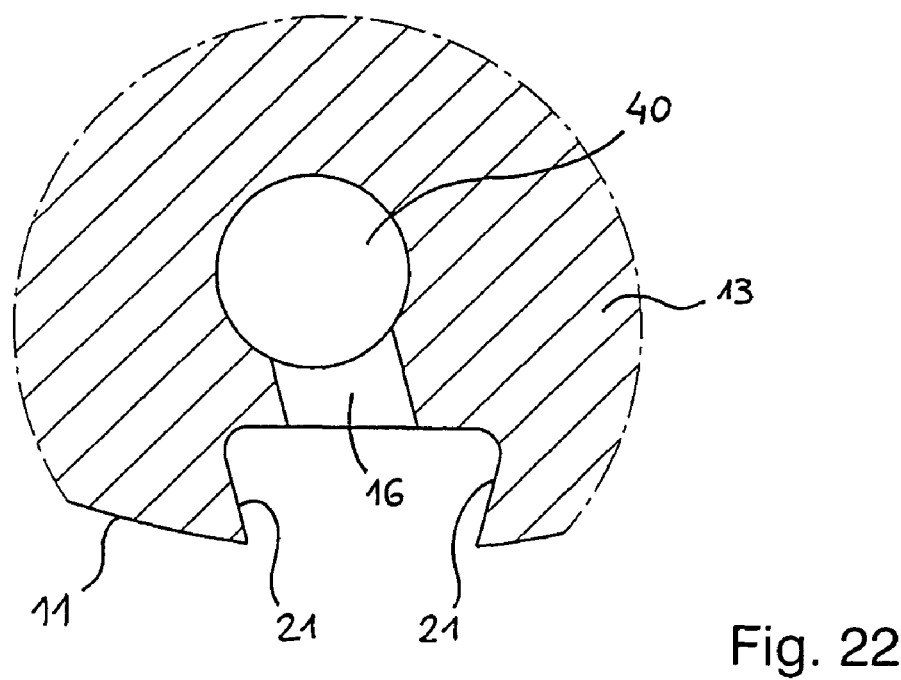
FIG. 22 shows an axxi section view of the pocket at the clamping bolt bore taken along line XXII-XXII in FIG. 21.
Figure 23:
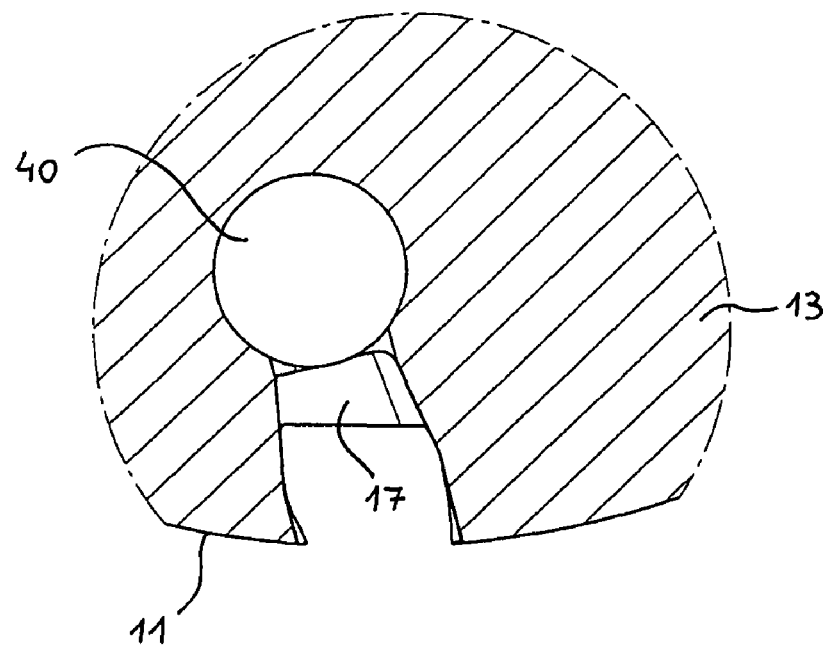
FIG. 23 shows an axial section view of the pocket at the adjustment bolt bore taken along line XXIII-XXIII in FIG. 21.

FIGS. 17-23 further show the design and alignment of the pin bore 40 and the respective cutter pocket 14, both provided in the cutter body 13. Preferably, there is more than just one pin bore 40 and cutter pocket 14 present in the cutter body 13. Optionally, there may be a relatively large number of pin bores 40 and associated cutter pockets 14, as shown for example in FIG. 1. Coming back to FIGS. 17-23, there are further apparent the pocket clamping bore 16 and the pocket adjustment bore 17. Particularly from FIG. 21 it is apparent that preferably these pocket bores 16, 17 are generally parallel in order to allow the adjustment bolt 70 (not shown in the Figure) to properly adjust the cutting member 30 (not shown in the Figure) seated in the cutter pocket 14 in a defined manner upon further engagement of the adjustment bolt 70 into the pin 50. The pocket adjustment bore 17 has segments that preferably correspond to the segments of the adjustment bolt 70: a cylindrical section 18 adjacent the cutter peripheral surface 11 and a conical section 19 that converges to the pin bore 40. An upper view onto the engagement of the before described elements particularly of the clamping bolt 60 is shown in FIG. 19. A preferred orientation of the pocket clamping and adjusting bores 16, 17, is further shown in FIGS. 22 and 23.

As shown in FIG. 19, the pocket clamping bore axis C is inclined with respect to a radial direction R of the cutting tool 10 at a bore axis inclination angle $\alpha$. The pocket clamping bore axis C is slanted rearwardly with respect to a direction of rotation 46 of the cutting tool 10. The bore axis inclination angle $\alpha$ guarantees that the cutting member 30 will be tangentially positively urged against the cutter pocket 14 of the cutter body 13, therefore, a member tangential abutment surface 22 at one side of the cutting member 30 will firmly abut the corresponding pocket tangential abutment surface 21. Furthermore, the tangential cutting force F applied on the cutting insert 28 during machining tends to urge the same member tangential abutment surface 22 against its corresponding pocket tangential abutment surface 21, thus assisting to a firm clamping of the cutting member 30 within its cutter pocket 14.

Assembling the cutting tool 10 will now be described with reference to FIGS. 1 to 23. The assembling comprises the steps of:

1—Inserting the pin 50 into the pin bore 40.

2—Aligning the pin clamping and adjusting bores 52, 53 with the pocket clamping and adjusting bores 16, 17.

This step is executed only when it is necessary. For example, if after inserting the pin 50 into the pin bore 40 the pin clamping and adjusting bores 52, 53 are already aligned with the pocket clamping and adjusting bores 16, 17, then, this step is unexecuted. Furthermore, if the pin 50 and the pin bore 40 are not cylindrical and relative rotation therebetween is prevented, then, also, this step is unexecuted.

3—Inserting the cutting member 30 axially rearwardly from the cutter front face 12 into the cutter pocket 14 of the cutter body 13 such that the radial abutment surfaces 39 of the cutting member 30 and the member tangential abutment surfaces 22 thereof slide, respectively, against the pocket base 15 and the pocket tangential abutment surfaces 21.

4—Inserting the clamping bolt 60 through the cutting member clamping hole 38, through the pocket clamping bore 16, and threadingly engaging the clamping bolt 60 into the pin clamping bore 52 without final tightening thereof.

5—Inserting the adjustment bolt 70 under the concave slanted portion 36 of the cutting member 30, through the pocket adjustment bore 17, and threadingly partially engaging it into the pin adjustment bore 53.

6—Continuing tightening the adjustment bolt 70 such that the head 72 thereof is supported against the cylindrical section 18 of the pocket adjustment bore 17. Simultaneously, the slanted conical head portion 74 of the adjustment bolt's head presses axially forwardly against the concave slanted portion 36 of the cutting member 30.

7—Continuing tightening the adjustment bolt 70 so that the cutting member 30 moves axially forwardly with respect to the cutter body 13 until the cutting member 30 reaches its required axial position with respect to the other cutting members in the cutter body 13, such that the cutting edges 32 of all the cutting members 30 are at the same level.

8—Final tightening the clamping bolt 60 to tightly retain the cutting member 30 within the cutter pocket 14.

9—Final tightening the adjustment bolt 70.

In case it is required to move the cutting member 30 axially rearwardly, step 7 may be followed by the step of untightening the adjustment bolt 70 thereby allowing the cutting member 30 to be moved axially rearwardly. If the elastic portion 54 that connects between the two segments of the pin 50 is in tension, it will retract and, accordingly, the cutting member 30 will move axially rearwardly.

Figure 24:
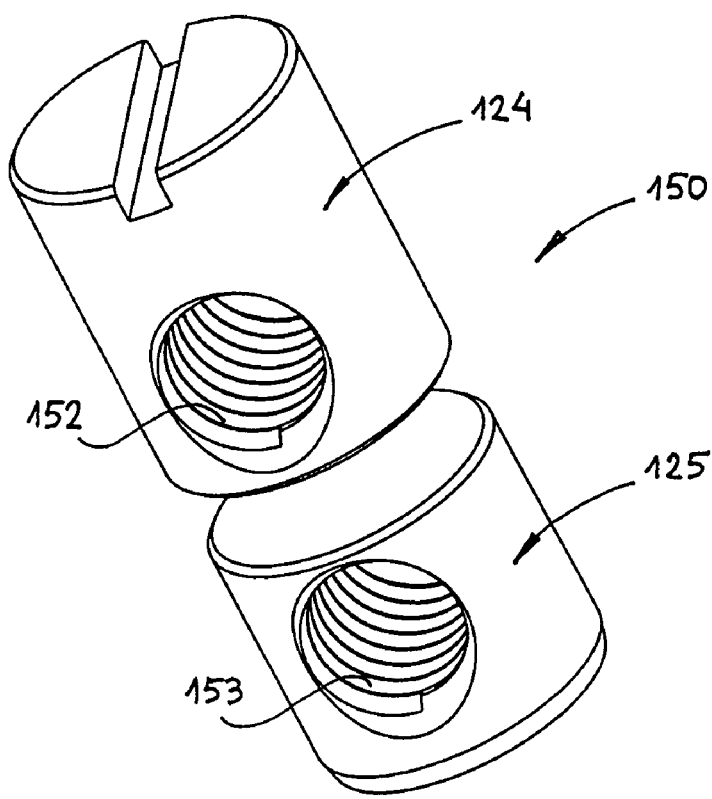
FIG. 24 shows a perspective view of a divided pin in accordance with another embodiment of the invention.
Figure 25:
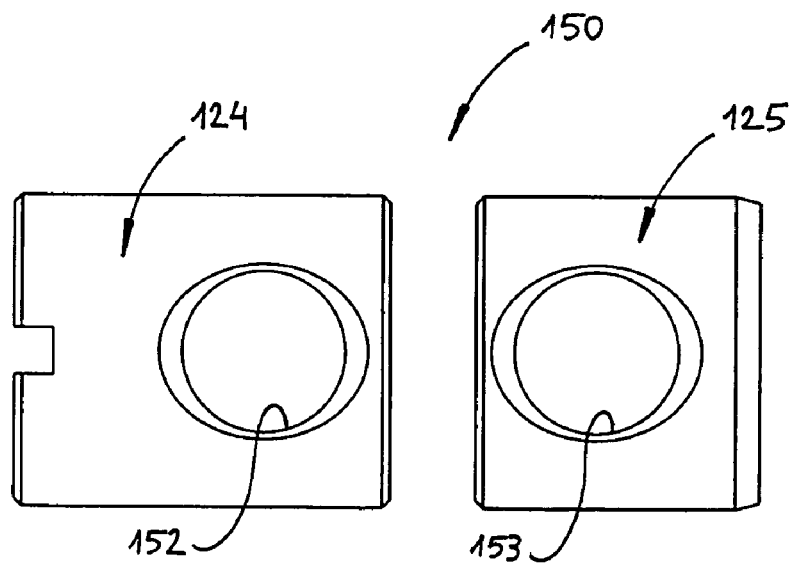
FIG. 25 shows a side view the divided pin shown in FIG. 24.

FIGS. 24-25 show an alternate embodiment of a second pin 150 that can be used with the attachment system 20. The second pin 150 is a divided pin which comprises two segments. A first segment is a clamping segment 124 and a second segment is an adjustment segment 125. The clamping segment 124 of the divided pin 150 has a pin clamping bore 152 and the adjustment segment 125 of the divided pin 150 has a pin adjustment bore 153. The divided pin 150 enables slight axial movement of the adjustment segment 125 of the divided pin 150 with respect to the clamping segment 124 thereof when the adjustment bolt 70 (not shown in FIGS. 24-25) is screwed into the pin adjustment bore 153. The clamping segment 124 may be coupled to the adjustment segment 125 in any appropriate manner (not shown) that will limit relative rotation therebetween and enable alignment of the pin adjustment bore 153 with the pocket adjustment bore 17. The clamping segment 124 may be coupled to the adjustment segment 125 by, for example, a tenon and mortise arrangement, a T-slot, a spring, a rubber, a dovetail arrangement, a pin and the like.

Figure 28:
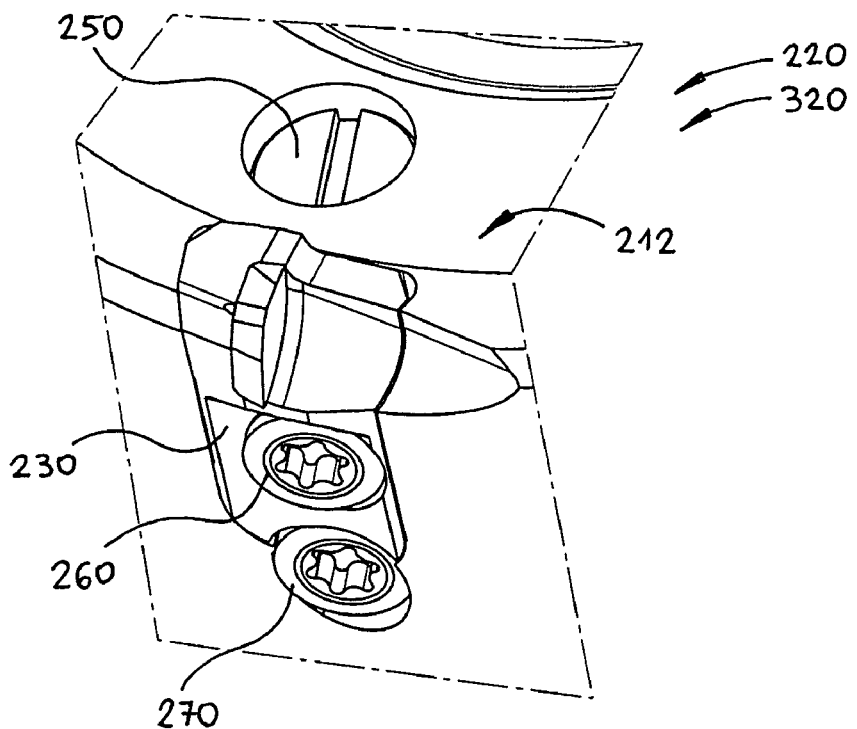
FIG. 28 shows a perspective view of a pocket of the cutting tool shown in FIG. 26 or in FIG. 27 together with a removably secured pin, cutting member, clamping bolt and adjustment bolt.

FIG. 28 shows an assembled attachment system according to either one of two embodiments of the invention, an attachment system 220 or an attachment system 320, that will be now described in further detail. The attachment system 220 and the attachment system 320 both have a pin 250, a cutting member 230, a clamping bolt 260 and an adjustment bolt 270 all of which are similar to the respective components of the attachment system 20 described above. The clamping bolt 260 and the adjustment bolt 270 releasably secure the cutting member 230 in the pocket and are engaged in the pin 250 in a similar manner as described in the attachment system 20.

Figure 26:
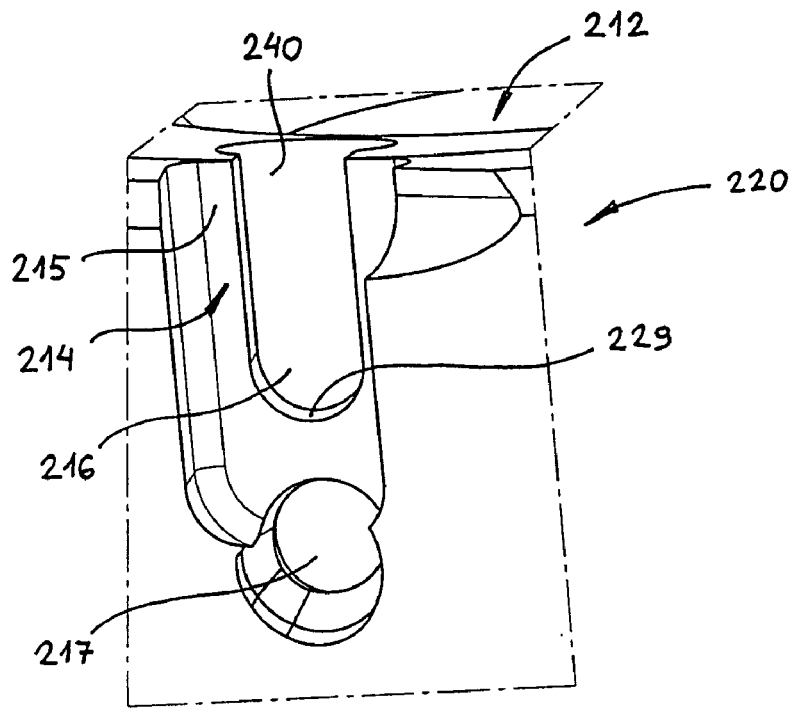
FIG. 26 shows a perspective view of a pocket of a cutting tool in accordance with another embodiment of the invention.

The attachment system 220 shown in FIG. 26 further has a cutter pocket 214 and an associated pin bore 240 generally similar to the cutter pocket 14 and pin bore 40 in the attachment system 20. The cutter pocket 214 is optionally dovetailed similar to the cutter pocket 14 described above and accommodates the cutting member 230. The cutter pocket 214 comprises a pocket adjustment bore 217 which communicates with the pin bore 240 and is generally similar to the pocket adjustment bore 17 described above. However, the pocket clamping opening, instead of being formed as a bore, such as the pocket clamping bore 16 described above, is in the form of a pocket clamping slot 216. The pocket clamping slot 216 communicates with the pin bore 240 and extends from a pocket base 215 to the pin bore 240 opening. The pocket clamping slot 216 also extends axially forwardly from a clamp opening base 229 to a cutter front face 212. The pocket clamping slot 216 and the pocket adjustment bore 217 accommodate the clamping bolt and the adjustment bolt respectively generally similar to the accommodation of the pocket clamping bore 16 and pocket adjustment bore 17 of the clamping bolt 60 and the adjustment bolt 70 respectively described above. Thus, in attachment system 220, the clamping bolt 260 is accommodated in the pocket clamping slot 216, while the adjustment bolt 270 is accommodated in the pocket adjustment bore 217.

Figure 27:
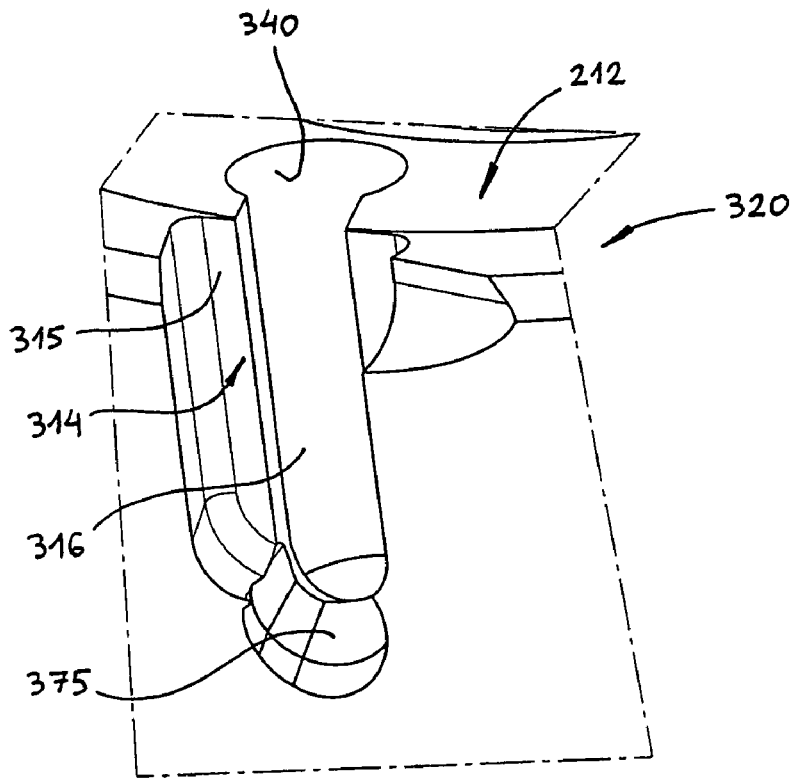
FIG. 27 shows a perspective view of a pocket of a cutting tool in accordance with another embodiment of the invention.

The attachment system 320 shown in FIG. 27 further has a cutter pocket 314 and an associated pin bore 340 generally similar to the cutter pocket 14 and pin bore 40 in the attachment system 20. The cutter pocket 314 is optionally dovetailed similar to the cutter pocket 14 described above and accommodates the cutting member 230. The cutter pocket 314 is devoid of a separate pocket adjustment bore, such as the pocket adjustment bore 17. The pocket clamping opening is in the form of an elongated pocket clamping slot 316 which communicates with the pin bore 340 and extends from a pocket base 315 to the pin bore 340 opening. The pocket clamping slot 316 also extends axially forwardly from a clamp opening base 375 to the cutter front face 212. The clamp opening base 375 is generally similar to the rear wall 75 of the pocket adjustment bore 17 described above. In the attachment system 320, the clamping bolt 260 is accommodated in the elongated pocket clamping slot 316, as is the clamping bolt 260 in the attachment system 220.

Figure 29:
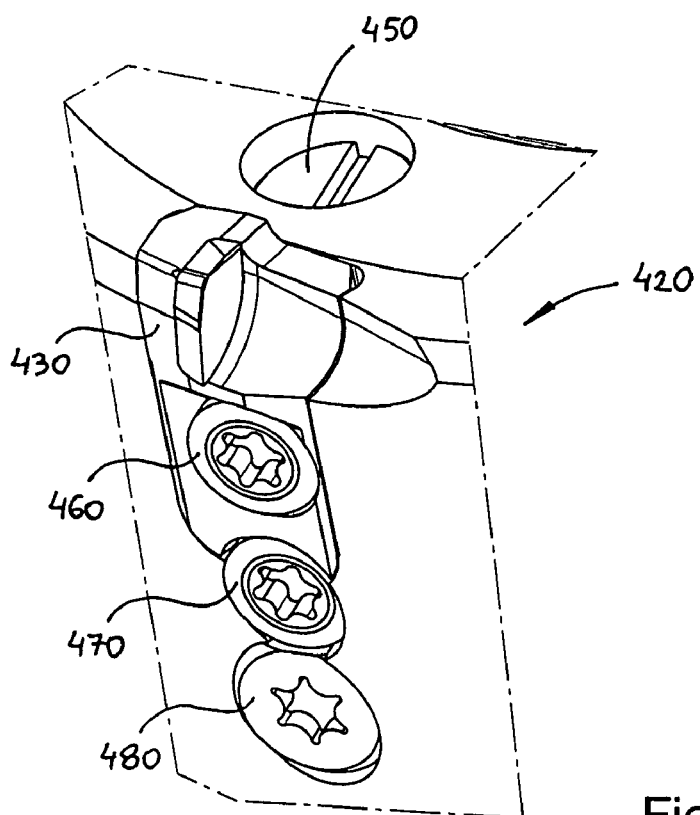
FIG. 29 shows a perspective view of a pocket of a cutting tool in accordance with another embodiment of the invention together with a releasably secured pin, cutting member, clamping bolt, adjustment bolt and friction bolt.
Figure 30:
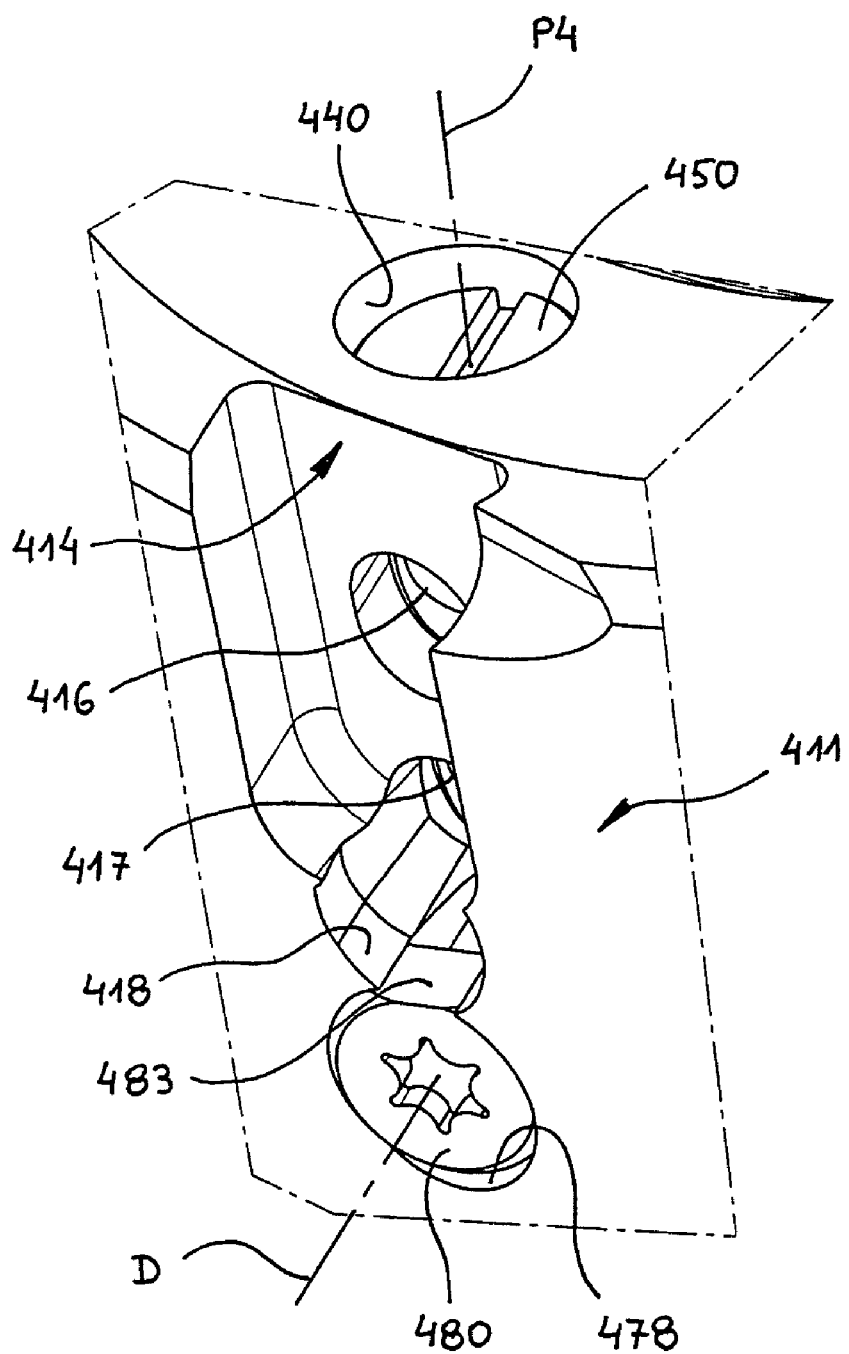
FIG. 30 shows the pocket shown in FIG. 29 together with the pin and the friction bolt.

An attachment system 420 according to another embodiment of the invention is shown in FIGS. 29-30. The attachment system 420 has a cutting member 430, a clamping bolt 460 an adjustment bolt 470, and a cutter pocket 414 that is optionally dovetailed and accommodates the cutting member 430, a pocket clamping bore 416 and a pocket adjustment bore 417 all of which are generally similar to the respective components of the attachment system 20 described above. A pin bore 440, having a pin bore axis P4, is associated with the cutter pocket 414 of the attachment system 420 as described with respect to the attachment system 20. The attachment system 420 further comprises a friction bolt 480 and a friction bore 478 that is associated with the cutter pocket 414 adjacent and generally parallel to the pocket adjustment bore 417. The friction bore 478 has a friction bore axis D that extends generally radially outwardly from the pin bore axis P4. The friction bore 478 extends from the cutter peripheral surface 411 to an opening in the pin bore 440.

Figure 31:
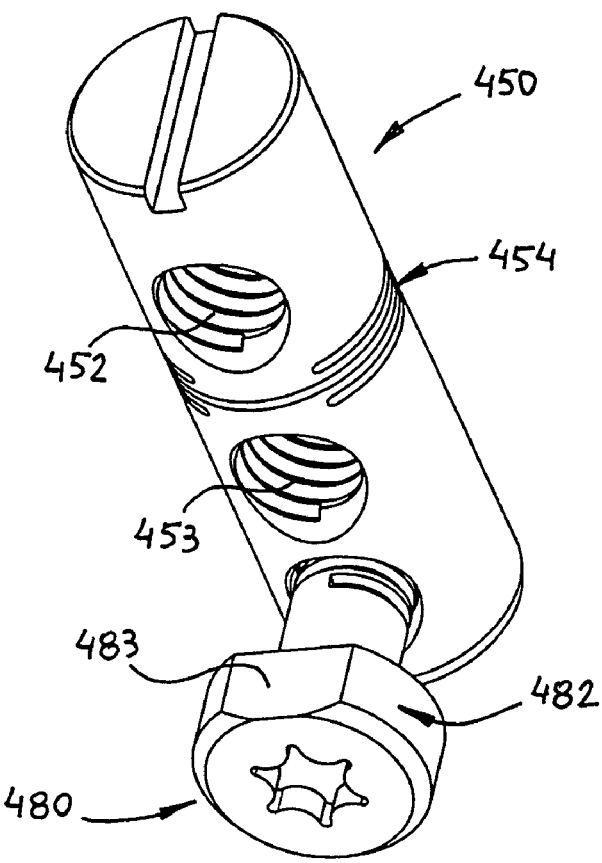
FIG. 31 shows a perspective view of the pin and the friction bolt shown in FIG. 30.
Figure 32:
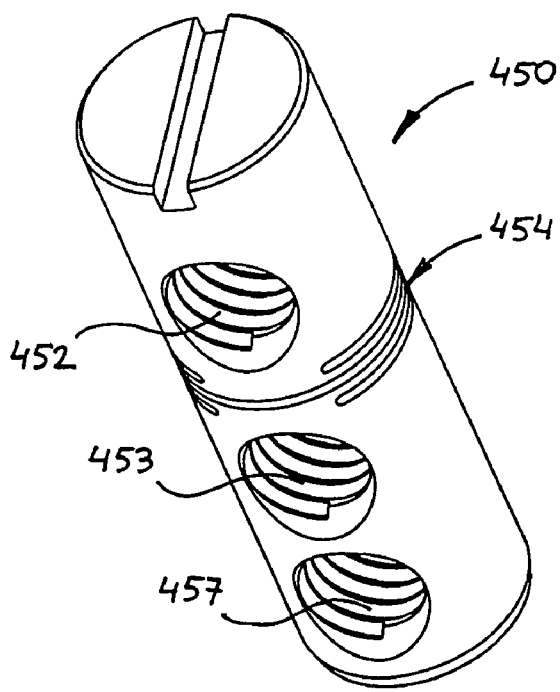
FIG. 32 shows a perspective view of the pin shown in FIG. 31.

Each pin bore 440 accommodates a pin 450 shown in further detail in FIG. 31. The pin 450 has a pin clamping bore 452 and a pin adjustment bore 453 as well as an elastic portion 454 generally similar to the respective components described above for the pin 50. The pin 450 further comprises a pin friction bore 457 adjacent the pin adjustment bore 453. All three pin bores are oriented so that when the pin 450 is located within the pin bore 440, all pocket bores, namely, the pocket clamping bore 416, pocket adjustment bore 417 and friction bore 478 are, respectively, aligned with the pin clamping bore 452, pin adjustment bore 453 and pin friction bore 457 in the pin 450.

The clamping bolt 460 and the adjustment bolt 470 releasably secure the cutting member 430 in the cutter pocket 414 and are engaged in the pin 450 in a similar manner as described for the attachment system 20. The friction bolt 480 may have three main sections: a friction bolt head 482, an intermediate portion and a threaded portion that engages the pin friction bore 457. Moreover, an optional shape of the friction bolt 480, more particularly of the friction bolt head 482 is derivable from FIG. 31. The engagement of the friction bolt 480 and particularly of the friction bolt head 482 can be seen in FIGS. 29-31. The friction bolt head 482 has a peripheral section 483 that adjoins the cylindrical section 418 of the pocket adjustment bore 417 when the friction bolt 480 is engaged in the friction bore 478 and in the pin friction bore 457. Thus, when the adjustment bolt 470 is engaged in the pin 450 for adjusting the cutting member 430, an adjustment bolt head 472 abuts the friction bolt head peripheral section 483. Consequently, in the case of an adjustment bolt head being of a harder material than the cutter's body material including an inner wall of an adjustment bore, the inner wall is not affected by frictional contact with the adjustment bolt head.

In other embodiments of the invention (not shown), a cutting tool may have at least one pocket having a friction bore and a friction bolt as described for cutter pocket 414 and a pocket clamping slot similar to either the pocket clamping slots 216, 316 described with respect to FIGS. 26 and 27.

Figure 33:
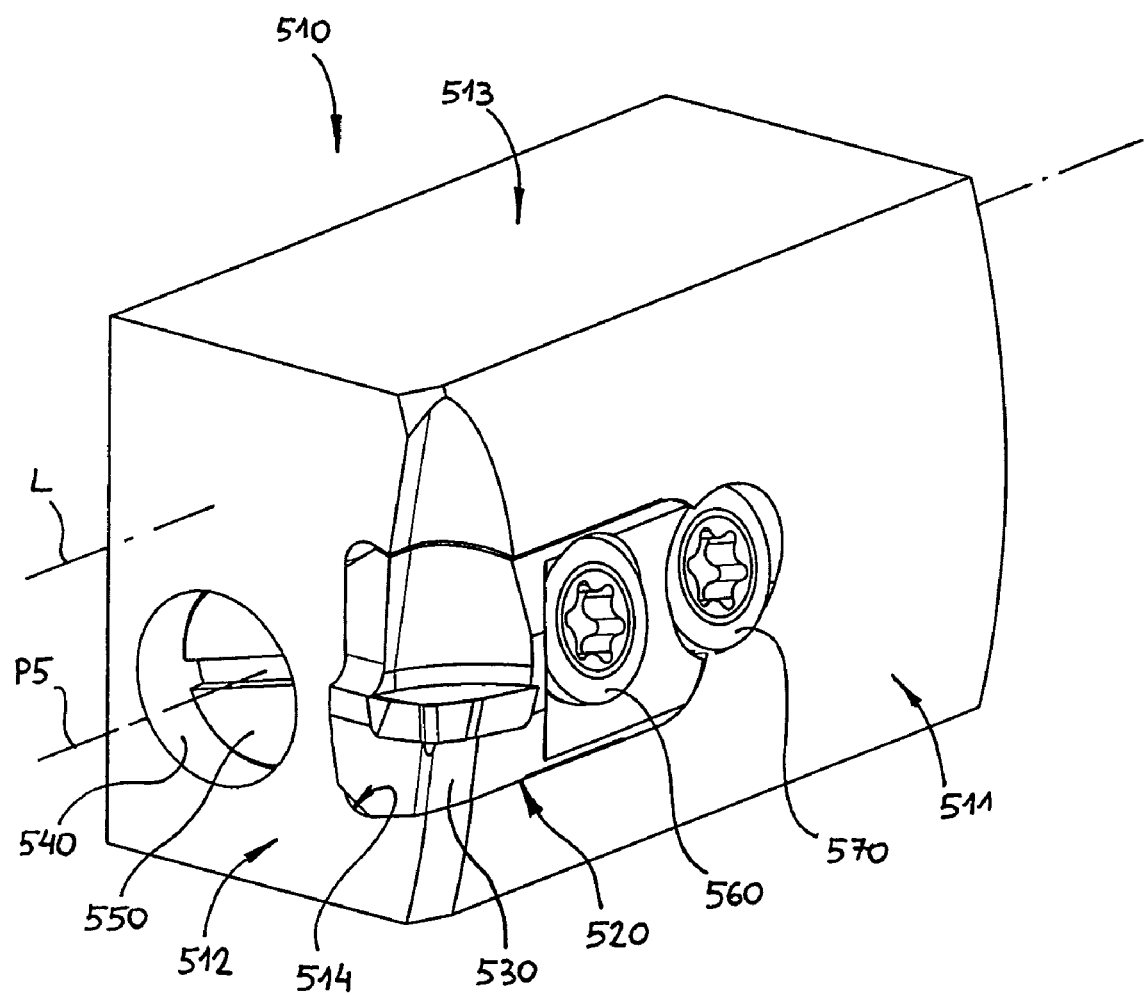
FIG. 33 shows a cutting tool in accordance with another embodiment of the invention.

FIG. 33 shows a schematically depicted non-rotary cutting tool which may be used in turning, parting and grooving in accordance with another embodiment of the invention. The cutting tool 510 has a cutter body 513 with a longitudinal axis L defining a front-to-rear direction and a pair of opposing cutter peripheral surfaces 511 extending rearwardly from a cutter front face 512. At least one attachment system 520 is located at a forward end of the cutter body 513. A cutter pocket 514 of the attachment system 520 opens out to the cutter front face 512 and to one of the cutter peripheral surfaces 511. Associated with the cutter pocket 514 is a pin bore 540 extending rearwardly from the cutter front face 512. The pin bore 540 has a pin bore axis P5 that extends optionally generally parallel to the longitudinal axis L. However, the pin bore axis P5 may also be inclined to the longitudinal axis L of the cutter body 513. The attachment system 520 is generally similar to the attachment system 20 described above and includes a cutting member 530, a clamping bolt 560 and an adjustment bolt 570. A pin 550 may be similar to either the pin 50 described with respect to attachment system 20 or the divided pin 150 described with respect to FIGS. 24 and 25. However, in other embodiments of the invention, any of the attachment systems 220, 320, 420 described above may be used.

Although the present invention has been described to a certain degree of particularity, it should be understood that various alterations and modifications can be made without departing from the scope of the invention as hereinafter claimed. For example, the system described above for attaching a member to a body and adjusting the member with respect to the body is not limited to be used in cutting tools only and it may be used with other kind of tools, such as lapping tools.

What is claimed is:

1. A cutting tool comprising:
a cutter body having a longitudinal axis and comprising:
a front face and a peripheral surface extending rearwardly from the front face;
at least one pin bore formed at the front face of the cutter body; and
at least one cutter pocket provided on the peripheral surface of the cutter body, the cutter pocket having a pocket clamping opening which communicates with the at least one pin bore; a cutting member located in the at least one cutter pocket, the cutting member comprising a clamping hole;
a pin located in the at least one pin bore, the pin comprising a first attachment bore and a second attachment bore;
a clamping bolt having a first attachment section which engages the first attachment bore of the pin, the clamping bolt releasably securing the cutting member to the cutter body; and
an adjustment bolt having a second attachment section which engages the second attachment bore of the pin, the adjustment bolt abutting the cutting member.

2. The cutting tool according to claim 1, wherein:
the cutter body is a rotating cutter body, the longitudinal axis is an axis of rotation of the cutter body, and the cutter body has a plurality of pin bores, each of which is associated with a cutter pocket and a cutting member.

3. The cutting tool according to claim 1, wherein the cutter body is a non-rotating cutter body.

4. The cutting tool according to claim 1, wherein:
the attachment bores in the pin are threaded bores; and
the attachment section of the clamping bolt and the attachment section of the adjustment bolt are threaded portions.

5. The cutting tool according to claim 1, wherein:
the pin has a generally cylindrical outer shape.

6. The cutting tool according to claim 1, wherein:
the pin is divided into at least two segments.

7. The cutting tool according to claim 1, wherein:
the pin has an elastic portion between the first attachment bore and the second attachment bore.

8. The cutting tool according to claim 7, wherein:
the elastic portion comprises at least one recess or groove located between the first attachment bore and the second attachment bore.

9. The cutting tool according to claim 1, wherein:
an end face of the pin has at least one torque transmitter configured for turning the pin and aligning the first and the second attachment bores of the pin with the pocket clamping opening.

10. The cutting tool according to claim 9, wherein:
the end face of the pin comprises an indicator indicating the direction of the attachment bores.

11. The cutting tool according to claim 1, wherein:
the cutting member has at least one slanted portion that is spaced apart from the clamping hole;
the adjustment bolt has a slanted head portion which engages said at least one slanted portion of the cutting member, for adjusting the cutting member to a defined position relative to the cutter body.

12. The cutting tool according to claim 11, wherein:
the clamping bolt has a slanted head portion which engages a correspondingly shaped slanted surface of the cutting member's clamping hole.

13. The cutting tool according to claim 1, wherein:
the pin further comprises a third bore;
the cutter body comprises a friction bore extending from the cutter body peripheral surface to the pin bore; and
a friction bolt engages the friction bore and the third bore.

14. The cutting tool according to claim 13, wherein:
the friction bolt has a friction bolt head peripheral section; and
the adjustment bolt has an adjustment bolt head which abuts the friction bolt head peripheral section.

15. The cutting tool according to claim 11, wherein:
the cutting member has a cutting section at one end and a concave adjustment section at an opposite, second end; and
said at least one slanted portion spaced apart from the clamping hole is provided in said concave adjustment section.

16. The cutting tool according to claim 1, wherein:
the cutting member comprises either a cutting insert, a cutting plate, or a cartridge for a cutting insert or a cutting plate.

17. The cutting tool according to claim 16, wherein:
the cutting member is a cartridge; and
the cartridge comprises a cartridge pocket suitable for retaining a cutting insert or a cutting plate.

18. The cutting tool according to claim 1, wherein:
the cutting member has a dovetail shape.

19. The cutting tool according to claim 18, wherein:
the at least one cutter pocket is provided with pocket tangential abutment surfaces having a dovetail shape that mate with a dovetail shape of member tangential abutment surfaces of the cutting member; and
in an assembled position of the cutting tool, at least one member tangential abutment surface of the cutting member abuts a corresponding pocket tangential abutment surface.

20. The cutting tool according to claim 1, wherein the cutter pocket further comprises:
a pocket adjustment bore which communicates with the at least one pin bore.

21. The cutting tool according to claim 20, wherein:
the pocket clamping opening comprises a pocket clamping bore;
the clamping bolt is accommodated in the pocket clamping bore; and
the adjustment bolt is accommodated in the pocket adjustment bore.

22. The cutting tool according to claim 20, wherein:
the pocket clamping opening comprises a pocket clamping slot which communicates with the pin bore and extends axially forwardly from a clamp opening base to the front face of the cutter body;
the clamping bolt is accommodated in the pocket clamping slot; and
the adjustment bolt is accommodated in the pocket adjustment bore.

23. The cutting tool according to claim 1, wherein:
the pocket clamping opening comprises an elongated pocket clamping slot which communicates with the pin bore and extends axially forwardly from a clamp opening base to the front face of the cutter body; and
the clamping bolt and the adjustment bolt are both accommodated in the pocket clamping slot.

24. The cutting tool according to claim 1, wherein:
the cutting member is formed from a material having a first hardness;
the pin is formed from a material having a second hardness; and
the cutter body is formed from a material having a third hardness;
wherein:
the first hardness and the second hardness are both greater than the third hardness.

25. A system for attaching a member to a body, the system comprising:
a pin having a longitudinal axis and a generally cylindrical outer shape, the pin comprising at least a first attachment bore and a second attachment bore;
a clamping bolt having a clamping section which is formed to releasably secure the member to the body and having a first attachment section which is formed to be releasably secured in the first attachment bore of the pin; and
an adjustment bolt having an adjustment section which is formed to adjust the position of the member relative to the body and having a second attachment section which is formed to be releasably secured in the second attachment bore of the pin.

26. A system for attaching a member made of a first material of a first hardness to a body made of a second material of a second hardness less than the first hardness, the system comprising:
a pin having a longitudinal axis and a generally cylindrical outer shape, the pin comprising at least a first attachment bore and being made of a third material of a third hardness greater than the second hardness of the second material of the body; and
at least a clamping bolt having a clamping section which is formed to firmly attach the member to the body and having a first attachment section which is formed to be firmly attached in the first attachment bore of the pin.

27. A cutting member having opposite ends and comprising:
a cutting section at one end, said cutting section including pocket configured to retain a cutting insert or a cutting plate;
a concave adjustment section at an opposite, second end;
a clamping hole between the first and second ends, the clamping hole configured to receive a clamping bolt for securing the cutting member to a cutter body; and
at least one concave slanted portion spaced apart from the clamping hole provided in said concave adjustment section, the concave slanted portion configured to engage an adjustment bolt for axial adjustment of the cutting member.

28. The cutting member according to claim 27, wherein:
the cutting member is a cartridge;
the cartridge comprises a cartridge pocket suitable for retaining a cutting insert or a cutting plate; and
the cartridge has a dovetail shape.

29. The cutting tool according to claim 1, wherein:
the adjustment bolt abuts a slanted portion of the cutting member such that a force applied by the adjustment bolt on the cutting member is directed transversely to member tangential abutment surfaces.

30. The cutting tool according to claim 1, wherein:
a pocket clamping bore axis is inclined from a radial direction of the cutting tool at a bore axis inclination angle.

31. The cutting tool according to claim 30, wherein:
the pocket clamping bore axis is inclined rearwardly with respect to a direction of rotation of the cutting tool.

32. A method for assembling a cutting tool comprising the steps of:
(a)—inserting a pin, having a pin clamping bore and a pin adjustment bore, into a pin bore extending axially rearwardly from a cutter front face of a cutter body;
(b)—inserting a cutting member axially rearwardly from the cutter front face into a cutter pocket of the cutter body, the cutter pocket being located in a peripheral surface of the cutter body, such that radial abutment surfaces of the cutting member and member tangential abutment surfaces of the cutting member slide, respectively, against a pocket base and pocket tangential abutment surfaces;
(c)—inserting a clamping bolt through a cutting member clamping hole, through a pocket clamping opening provided in the cutter pocket, and threadingly engaging the clamping bolt into the pin clamping bore without final tightening of the clamping bolt;
(d)—inserting an adjustment bolt under a concave slanted portion of the cutting member, through the pocket clamping opening, and threadingly partially engaging it into the pin adjustment bore;

(e)—continuing tightening the adjustment bolt such that a head thereof is supported against a cylindrical section of the pocket clamping opening, and, simultaneously, a slanted head portion of the adjustment bolt's head presses generally axially forwardly against the concave slanted portion of the cutting member;

(f)—continuing tightening the adjustment bolt so that the cutting member moves axially forwardly with respect to the cutter body until the cutting member reaches its required axial position with respect to other cutting members in the cutting body, such that cutting edges of all cutting members are at the same level;

(g)—final tightening the clamping bolt to tightly retain the cutting member within the pocket;

(h)—final tightening the adjustment bolt.

33. The method of claim 32, further comprising the step of aligning the pin bores with a pocket clamping opening provided in a cutter pocket that is located in a peripheral surface of the cutter body, after inserting the pin into the pin bore.

34. The method of claim 32, further comprising the step of untightening the adjustment bolt and moving the cutting member axially rearwardly.

35. The cutting member according to claim 27, wherein the concave slanted portion is formed from a plurality of slanted segments.

* * * * *